United States Patent [19]

McMullan, Jr.

[11] Patent Number: 5,251,324

[45] Date of Patent: Oct. 5, 1993

[54] METHOD AND APPARATUS FOR GENERATING AND COLLECTING VIEWING STATISTICS FOR REMOTE TERMINALS IN A CABLE TELEVISION SYSTEM

[75] Inventor: Jay C. McMullan, Jr., Doraville, Ga.

[73] Assignee: Scientific-Atlanta, Inc., Norcross, Ga.

[21] Appl. No.: 671,532

[22] Filed: Mar. 19, 1991

Related U.S. Application Data

[60] Continuation-in-part of Ser. No. 562,675, Aug. 3, 1990, which is a division of Ser. No. 503,422, Apr. 2, 1990, Pat. No. 5,142,690, which is a continuation-in-part of Ser. No. 498,084, Mar. 20, 1990, Pat. No. 5,155,590, and Ser. No. 498,083, Mar. 20, 1990.

[51] Int. Cl.$^5$ .............................................. H04H 9/00
[52] U.S. Cl. ........................................ 455/2; 455/5.1; 455/6.1; 358/84; 358/86
[58] Field of Search ...................... 455/2, 4.1, 4.2, 5.1, 455/6.1, 6.2, 70, 181.1, 185.1, 186.1; 358/84, 86; 379/92; 370/85.8, 95.2

[56] References Cited

U.S. PATENT DOCUMENTS

| | | | |
|---|---|---|---|
| 4,546,382 | 10/1985 | McKenna et al. | 358/84 |
| 4,905,080 | 2/1990 | Watanabe et al. | 358/84 |
| 4,943,963 | 7/1990 | Waechter et al. | 370/94.1 |
| 5,081,680 | 1/1992 | Bennett | 380/50 |

Primary Examiner—Reinhard J. Eisenzopf
Assistant Examiner—Chi Pham
Attorney, Agent, or Firm—William A. Marvin; Frederick W. Powers, III

[57] ABSTRACT

A method and apparatus for generating and collecting viewing statistics in a cable television system is provided. For example, data relating to television channels being viewed at remote terminals may be generated by each remote terminal and then collected by a system manager. A system manager transmits one or more record times downstream to one or more remote terminals indicating a future point in time at which the terminal is to record the viewing statistics. The remote terminals store the one or more record times in memory and when the record time matches the current real time, the remote terminals store in memory the viewing statistics. Thereafter, in response to a polling signal from the system manager, the set top terminals transmit the previously recorded viewing statistics along with a time code corresponding to the time at which the viewing statistics were recorded upstream to the system manager, and the system manager processes this information accordingly. In one embodiment, the viewing statistics are generated from status information within each remote terminal. In another embodiment, the viewing statistics are generated from user inputs to each remote terminal. In one embodiment, several collection slots exist in each remote terminal for receiving and maintaining more than one record time at a time. In another embodiment, the system manager transmits record times and polling signals for each particular collection slot independently from and at different times than the other collection slots.

34 Claims, 18 Drawing Sheets

| COLLECTION SLOT | RECORD TIME STORAGE LOCATION | CHANNEL STORAGE LOCATION | TIME CODE STORAGE LOCATION |
|---|---|---|---|
| A | RTSL1 | CSL1 | TCSL1 |
| B | RTSL2 | CSL2 | TCSL2 |
| C | RTSL3 | CSL3 | TCSL3 |
| ⋮ | ⋮ | ⋮ | ⋮ |
| Xn | RTSLn | CSLn | TCSLn |

*FIG. 13*

| SLOT | RECORD TIME | TIME CODE RETURNED | |
|---|---|---|---|
| A | RT1 | TCn | 1 HOUR |
| B | RT2 | | |
| C | RT3 | | |
| D | RT4 | | |
| A | RT5 | TCn + 1 | |
| B | RT6 | | |
| C | RT7 | | |
| D | RT8 | | |
| A | RT9 | TCn + 2 | |
| B | RT10 | | |
| C | RT11 | | |
| D | RT12 | | |

*FIG. 14*

| EVENT / VIEWING STATISTICS REPLY PACKET ||||
|---|---|---|---|
| BYTE | DESCRIPTION | VALUE | COMMENTS |
| 0,1 | REPLY TYPE | 0 | |
| 2,3 | RECEIVER STATUS | 0-FFh | |
| 4-7 | MESSAGE REMAINING COUNT | 0-65535 | MESSAGES TO BE SENT INCLUDING THESE MSGS. |
| 8-11 | UNIQUE MESSAGE COUNT | 065535 | UNIQUE MSGS RECVD SO FAR |
| 12,13 | PACKET COUNT | 0-255 | NUM MSGS IN PACKET |
| 14-17 | PACKET LENGTH | 0-65535 | LENGTH BEFORE HEX CONV |

| EVENT / VIEWING STATISTICS (SINGLE SETTOP SHOWN) ||||
|---|---|---|---|
| 0,1 | LEVEL RATING | 0-2 | HIGH(2), OK(1), LOW(0) |
| 2,3 | REPLY LENGTH | 0-255 | NUM BYTES IN MSG NOT INCLUDING LEVEL RATING |
| 4,5 | MESSAGE TYPE | 4/14H | 4 OUTBAND, 14H INBAND |
| 6-13 | STT ADDRESS | 0-FFFF FFFFh | |
| 14,15 | VIEW CHANNEL A | 0<br>1-128<br>255 | OFF<br>CHANNEL #1-128<br>ALREADY REPORTED |
| 16,17 | TIME CODE A | 0-255 | MSG OF REC. TIME |
| 18,19 | VIEW CHANNEL B | 0-128,255 | |
| 20,21 | TIME CODE B | 0-255 | |
| 22,23 | VIEW CHANNEL C | 0-128,255 | |
| 24,25 | TIME CODE C | 0-255 | |
| 26,27 | VIEW CHANNEL D | 0-128,255 | |
| 28,29 | TIME CODE D | 0-255 | |
| 30,31 | SECURITY NIBBLE | 0-FFh | |
| 32,33 | AUTH CHANNEL CHECKSUM | 0-FFh | |
| 0-3 | EVENT #1 ID (LSB FIRST) | 0-9999 | PHASE 6 FORMAT |
| 4-9 | EVENT #1 TIME (LSB FIRST) | 0-FFFFFFh | PHASE 6 FORMAT |
| 10--X | EVENT #n ID (LSB FIRST)<br>EVENT #n TIME (LSB FIRST) | 0-9999<br>0-FFFFFFh | PHASE 6 FORMAT<br>PHASE 6 FORMAT |
| | REPLY CHECKSUM (LSB FIRST) | 0-FFFFh | ROTATE SUM / ADD BYTE |
| | PACKET CHECKSUM | 0-FFFFh | ROTATE SUM / ADD BYTE |
| | CR | CR | TERMINATES REPLY |

RF-IPVV PROCESSOR ORIGINATED

RF-STT ORIGINATED

*FIG. 16*

| BYTE | FIELD | DESCRIPTION |
|---|---|---|
| 01-03 | PREAM | PREAMBLE. SEQUENCE $AA, $AA, $AA. |
| 04 | SOM | START OF MESSAGE. $AB. |
| 05 | COUNT | NUMBER OF BYTES IN MESSAGE (INCLUDING CHECKBYTE, BUT NOT PREAM AND SOM). |
| 06 | TYPE | CALLBACK TYPE. $04 FOR 8580 EVENT/VIEWING STATISTICS REPLY, $14 FOR 8570/90. |
| 07-10 | ADDR | STT DIGITAL ADDRESS. |
| 11 | VIEW1 | VIEW CHANNEL A |
| 12 | TIME1 | TIME CODE A |
| 13 | VIEW2 | VIEW CHANNEL B |
| 14 | TIME2 | TIME CODE B |
| 15 | VIEW3 | VIEW CHANNEL C |
| 16 | TIME3 | TIME CODE C |
| 17 | VIEW4 | VIEW CHANNEL D |
| 18 | TIME4 | TIME CODE D |
| 19 | SECUR | SECURITY NIBBLE (FOUND IN OUTBAND TRANSACTIONS 1-5-0-0--6-4-0-0 AND 3--6-4-0-0, RF-IPPV CALIBRATION PARAMETERS; INBAND TRANSACTION 14-4-00). |
| 20 | AUTH | STT AUTHORIZED CHANNEL LIST CHECKSUM. |
| 21-22 | EVENT | EVENT NUMBER. MSB FIRST. |
| 23 | BIWEEK | MOST SIGNIFICANT 7 BITS OF BIWEEK OF EVENT. |
| 24-25 | TIME | TIME EVENT WAS BOUGHT OR VCR EVENT WAS PROGRAMMED. MSB FIRST. |
| (n-1) - n | CHECK | 16-BIT CHECKSUM. MSB FIRST. |

BYTES 21 - 25 ARE REPEATED FOR EACH EVENT IN NVM.

*FIG. 17*

SL SW 1 5 0 0 TA0 TA1 TA2 TA3  6 5 ACT 0 TB0 TB1 TB2 TB3  TC0 TC1 TC2 TC3 TD0 TD1 TD2 TD3

BIT PATTERNS:

| | | |
|---|---|---|
| $TX0_{0-3}$ | $TIME_{12-15}$ | RECORDING TIME FOR VIEWING SLOT X. |
| $TX1_{0-3}$ | $TIME_{8-11}$ | |
| $TX2_{0-3}$ | $TIME_{4-7}$ | |
| $TX3_{0-3}$ | $TIME_{0-3}$ | |
| $ACT_0$ | $ACTIMA_0$ | ACCEPT TIME FOR SLOT A. |
| $ACT_1$ | $ACTIMB_0$ | ACCEPT TIME FOR SLOT B. |
| $ACT_2$ | $ACTIMC_0$ | ACCEPT TIME FOR SLOT C. |
| $ACT_3$ | $ACTIMD_0$ | ACCEPT TIME FOR SLOT D. |

*FIG. 18*

METHOD AND APPARATUS FOR GENERATING AND COLLECTING VIEWING STATISTICS FOR REMOTE TERMINALS IN A CABLE TELEVISION SYSTEM

CROSS-REFERENCE TO RELATED APPLICATIONS

This application is a continuation-in-part application of U.S. application Ser. No. 07/562,675 filed on Aug. 3, 1990, and entitled "Cable Television Radio Frequency Return Method," which is a divisional application of U.S. application Ser. No. 07/503,422 now U.S. Pat. No. 5,142,690 filed on Apr. 2, 1990 and entitled "Cable Television Radio Frequency Data Processor." Application Ser. No. 07/503,422 is a continuation-in-part application of commonly assigned copending application Ser. No. 498,084, now U.S. Pat. No. 5,155,590 entitled "Cable Television Radio Frequency Subscriber Data Transmission Apparatus and Calibration Method" and commonly assigned copending application Ser. No. 498,083 entitled "Cable Television Radio Frequency Subscriber Data Transmission Apparatus and RF Return Method", both filed Mar. 20, 1990.

BACKGROUND OF THE INVENTION

1. Technical Field

The present invention generally relates to a method and apparatus for generating and recovering viewing statistics from a plurality of remote terminals in a cable television system, and more particularly to a method and apparatus for remotely programming remote terminals to monitor and record viewing statistics at specific times and returning this data to a system manager in a timely manner to be accumulated and processed.

1. Description of the Prior Art

The development of cable television systems has reached the stage where the provision of two way information flow is not only desirable but is practically required by the implementation of new services. For example, in the implementation of impulse pay-per-view service where the subscriber may impulsively select an event for viewing and assume a charge, at least one data channel such as a telephone communication channel or an RF channel is required in an upstream (reverse) direction from a cable television subscriber to a cable television headend to report service usage data. Other uses for a return path include power meter reading, alarm services, subscriber polling and voting, collecting subscriber viewing statistics, and home shopping. While not every cable television system operator provides for two way transmission, manufacturers of cable television equipment have tended to provide for upstream transmission in the direction from the subscriber toward the headend. Practically all such manufacturers provide so-called split or two way systems having a spectrum of frequencies for upstream transmission which at least includes a band from 5 to 30 megahertz. This band of interest comprises cable television channel T7 (5.75-11.75 megahertz), T8 (11.75-17.75 megahertz), T9 (17.75-23.75 megahertz) and T10 (23.75-29.75 megahertz). These return path channels, each having television signal bandwidth, may be used, for example, for video conferencing. Whether a so-called "sub-split", "mid-split" or "high-split" system is applied for two way transmission by a headend operator, all three types of split transmission systems typically involve an upstream transmission in the 5-30 megahertz band of interest.

The concept of Impulse Pay Per View (IPPV) is well understood in the art, but is described briefly here for completeness. Essentially it is a sales method by which a pay (cable) television subscriber may purchase specific program events on an individual basis. Furthermore, the purchase may be contracted on an "impulse" basis solely by interacting with the subscriber's in-home set-top terminal (STT). Although it is not a requirement that the event being purchased be "in progress", it is a requirement that the system support the purchase of events that are in progress. The purchase must be handled in a manner that does not incur any appreciable delay in the subscriber's ability to view the event immediately (i.e. instant gratification).

Although several techniques of implementing the above sales method exist, all techniques have common requirements. Some part of the system must make a decision whether or not to allow the purchase and subsequent viewing of the event. If allowed, the purchase of the specific event must be recorded and reported to what is typically known as the "billing system" so that the program vendor eventually receives revenue from the transaction.

To accomplish purchased event reporting, a so-called "store and forward" technique is used. In the store and forward method, the set-top terminal assumes that if the subscriber is preenabled for IPPV capability, then an event purchase is allowed. When the subscriber performs the necessary steps to purchase an event, the set-top terminal allows the event to be viewed (typically by descrambling a video signal on a particular channel) and records information or data relating to the purchase of the event. The record is typically stored in a secure, nonvolatile memory, as it represents revenue to the program vendor.

Obviously, in order to realize the revenue, the vendor's billing system must recover the purchase record data stored in all of the subscribers' set-top terminals in a timely manner. To accomplish this, the system control computer (hereafter called the system manager) periodically requests that the set-top terminals return the IPPV purchase data stored in memory. When the system manager receives the data from a set-top terminal, it typically then acknowledges the receipt to the terminal (see, et al., U.S. Pat. No. 4,586,078) and the data is cleared from memory to make room for additional purchase data. The system manager then forwards this data to the billing system, and the IPPV purchase cycle is completed.

Closely related to the Impulse Pay Per View concept is a requirement for collecting viewing statistics from remote subscriber terminals. Such viewing statistics could include: the channels being viewed on a subscribers television set, whether the television set is turned on or off, the sound volume level of the television, the luminance level of the television set, etc. In addition, it might be informative to determine the number of viewers of a television program, the age or sex of the viewers, etc. As an example, it is very desirable for cable television system operators to inquire into which television channels are being viewed at each remote terminal location in order to determine the success of the television programs being provided to the subscribers. Once this viewing information is collected, cable operators are better able to plan future programming based upon the actual viewing habits and preferences of their subscriber customers. Also, potential cable television advertisers are able to make better decisions about markets in which to broadcast their commercial messages. The above listing of types of viewing statistics is, of course, not inclusive, as other types of information relating to the usage habits of subscribers in relation to the remote terminals could be collected as well.

In addition, cable television companies have recently been requested by regulatory authorities to provide emergency and/or "basic" services to certain individuals or to require that certain programs be provided, such as coverage of governmental proceedings. There is a concomitant need to determine the success of such requirements by measuring the viewing habits of the affected individuals.

Several techniques exist to implement the collection of viewing statistics in a cable television system. However, all of these techniques have serious limitations in their implementation. A common limitation which all of these techniques possess is the lack of ability to quickly and efficiently transmit the requested viewing statistics from each remote set-top terminal to the system manager at the headend.

One technique for collecting such viewing statistics consists of manually asking each subscriber which television channels that they view at specific times. This can be accomplished over the telephone, through the mail, or in person. An obvious disadvantage of this method is that viewing information cannot be gathered in a timely manner, and the reliability of a subscriber's memory in recollecting previously viewed channels might be limited.

Another method utilized in collecting viewing statistics comprises generating such viewing statistics at each remote terminal in response to commands from the system manager at the head end. The viewing statistics are typically stored in a memory location at each remote terminal, and are thereafter transmitted through preexisting telephone lines to the system manager. Although this method provides for an improved system for reliably transmitting channel viewing information in a timely fashion, this technique has several disadvantages. First, because preexisting telephone lines are used for transmission, these lines are unavailable for normal household use during the duration of the transmission. Second, special additional equipment needs to be furnished to connect the remote terminal and the system manager to the phone lines, adding to the expense and maintenance cost of this system. Third, because non-dedicated lines are used, a substantial time overhead exists during which an appropriate transmittal connection is made, severely reducing effective data throughput.

Consequently, there remains a need in the art for a method and apparatus for quickly and efficiently generating and collecting viewing statistics from remote terminals in a cable television system.

SUMMARY OF THE INVENTION

The present invention relates to a method and apparatus for collecting viewing statistics associated with remote terminals in a bi-directional cable television system. The present invention is primarily related to programming remote terminals to record channel viewing information at future times, and the remote terminals subsequently returning this information upstream to the system manager once the information has been recorded.

It is one object of the present invention that implementing the collection of viewing statistics not require any significant changes to the billing system. Furthermore, the collection of viewing statistics should operate independently of telephone line return; i.e., they should operate side by side. Also, the collection of viewing statistics should be compatible with any headend or terminal apparatus used for forward or downstream transmission. A familiarity with the system apparatus and terms may be obtained from the following overview:

SYSTEM MANAGER. This is the primary control computer for the cable television system. The system manager accepts input commands from both human operators and the billing computer. It generates appropriate control transactions that are sent over the forward (downstream) cable path to the set-top terminals via a control transmitter. It accepts return data from a frequency diverse data receiver and processor (also called herein the RF-IPPV processor) and forwards the return data to the billing computer.

CONTROL TRANSMITTERS. These are devices for converting standard RS-232 serial data from the system manager to a modulated RF signal for transmission over the cable to a set-top terminal or IPPV module. In a known cable system available from the assignees of the present invention, the control transmitter may be an Addressable Transmitter (ATX) or a Headend Controller and Scrambler, or a combination of both. For the purposes of the present invention, the control transmitter is primarily a pass-through device and is described for completeness.

BI-DIRECTIONAL AMPLIFIER. These trunk distribution amplifiers and line extenders amplify and pass a certain portion of the RF spectrum in the forward (downstream) direction and a different portion of the RF spectrum in the reverse direction. This makes BI-DIRECTIONAL communication possible over a single coaxial cable. The BI-DIRECTIONAL amplifiers are also passthrough devices and are described only for completeness.

SET-TOP TERMINAL. These devices are the interface between the cable system and a subscriber and his/her television set. These devices may be located either in close proximity to the associated television set, or at an off-premises location. For our purposes, the term set-top terminal will refer to a remote terminal located at either location. Among other functions, the set-top terminals perform tuning, frequency down conversion, and descrambling of the cable video signals on a selective basis. They accept both global and addressed control transactions (i.e. transactions directed to either all or individual terminals) from the control transmitter to configure and control the services they deliver. In addition, the set-top terminal may be equipped with an internal radio frequency return module or be provided with an interface to an adjunct external data return module so that a secure memory device of either the terminal or the external module may be provided for storing purchased event or other data to be returned. Furthermore, either the set-top terminal or an associated module includes a frequency diverse reverse path data transmitter in accordance with the present invention. Such a set-top terminal either equipped or associated with an RF-IPPV module will be referred to herein as an RF-STT, STT, or simply remote terminal.

RF-IPPV MODULE. The RF-IPPV module is a module associated with the set-top terminal if the settop terminal is not provided with an internal frequency diverse reverse path RF data transmitter.

RF-IPPV PROCESSOR. The RF-IPPV processor is primarily a frequency diverse RF data receiver for the reverse path data transmitters of the terminals or modules. It simultaneously recovers data from modulated RF signals on up to four (or more) distinct reverse data channels. It then filters out redundant data messages, assembles the data into packets, and forwards the packets to the system manager on a standard RS-232 data link. A minimum of one processor is required for each cable television system headend.

It is an overall object of the present invention that the collection of viewing statistics work reliably and have a high data throughput, integrity and security. More particularly, the present invention is designed to meet four specific performance goals:

1. The collection of viewing statistics must utilize a data throughput scheme whereby a maximum amount of data is returned from the set-top terminals within a predetermined time period in order to be able to monitor the viewing patterns of subscribers on a regular basis.

2. The period of time allocated to the collection of viewing statistics must be of sufficient duration to obtain a reliable statistical sampling of the viewing population.

3. The time at which to collect viewing statistics from each set-top terminal must be precisely defined so as to guarantee that a true "snapshot" of the state of the numerous set-top terminals is received by the system manager.

4. The types and format of viewing statistics capable of being generated and collected must be flexible.

In accordance with the present invention, a method and apparatus is provided for generating and collecting viewing statistics from a plurality of remote terminals which satisfy the four goals above. The viewing statistics data could correspond to various types of data corresponding to the types of viewers watching the television set connected to the remote terminal or data relating to the status of the remote terminal itself.

Each remote terminal has at least one collection slot consisting of a record time storage location, a viewing statistics storage location, and a time code storage location for storing a record time, viewing statistics information, and additional information corresponding to the time at which the viewing statistics were generated, respectively. In a preferred embodiment, the television channel being viewed is the designated viewing statistic being collected, and therefore the above-mentioned viewing statistic storage location would correspond to a channel storage location. However, the viewing statistic storage location could just as easily be a sound volume storage location, a remote terminal power on/off indicator storage location, or any other designation corresponding to data relating to the viewers watching the television set (Viewer profile data) or data relating to the status of the television set itself (Television status data).

The record time consists of information sent downstream from the system manager to each set-top terminal corresponding to some future time at which each set-top terminal is to store the particular viewing statistics status. More particularly, the record time is stored in the record time storage location, and when the record time equals the current real time, the status of the remote terminal corresponding to the particular viewing statistics type being recorded, is stored in the viewing statistics storage location and a time code representing the current time is stored in the time code storage location. For example, in the preferred embodiment where the current channel being viewed is being stored and collected, the channel being viewed is stored in the viewing statistics storage location (in this case referred to as the channel storage location) and a time code is stored in the time code storage location when the record time equals the current real time.

After the viewing statistic, such as the channel in the preferred embodiment, and the time code are stored in the appropriate storage locations at the remote terminal, the contents of these storage locations are transmitted upstream to the system manager either automatically, or in response to a polling signal. The system manager determines which particular collection slot is being returned by comparing the time code returned to a list of record times originally sent downstream to each set-top terminal. By doing so, the system manager is able to verify which collection slot has been returned by each set-top terminal, and is able to compile viewing statistics for the entire set-top terminal population.

Also in accordance with the present invention, a method for generating and collecting viewing statistics is provided consisting of the above-described steps and additional steps. As described before, the record time is stored in the record time storage location, and once the record time is equal to the current real time, the appropriate viewing statistic and the time code are stored in the channel storage location and time code storage location. However, unlike the situation where the system manager sends all of the record times for the various collection slots downstream at once, the present invention allows for the system manager to send a record time downstream for any collection slot at any time. Thus, while the system manager is programming one collection slot to record a channel at a future time, the system manager can be receiving the viewing statistic information and time code of another collection slot transmitted from the same or another set-top terminal.

These and other features of the present invention will be readily understood by one skilled in the art from the following detailed description when read in connection with the drawings.

BRIEF DESCRIPTION OF THE DRAWINGS

FIG. 7 representing the front end module, FIG. 8 representing the frequency synthesizer, FIGS. 9A-C representing the RF receiver, FIG. 10 representing the signal strength analyzer and FIG. 11 representing the controller assembly.

FIG. 13 is a diagram depicting the various storage locations associated with each collection slot within a set-top terminal.

FIG. 14 is a timing diagram showing the record times sent to the remote terminals, and the resulting time codes returned to the system manager.

FIG. 16 is a diagram showing a sample Event/Viewing Statistics Reply packet transmitted from the RF-IPPV Processor to the system manager, which includes the contents of a Event/Viewing Statistics Reply, as shown in FIG. 17.

FIG. 17 is a diagram showing the contents of an Event/Viewing Statistics Reply transmitted upstream from an RF-IPPV module located at a set-top terminal.

FIG. 18 is a diagram of a viewing statistics record time instruction transmitted downstream from the system manager to a set-top terminal.

DETAILED DESCRIPTION OF THE INVENTION

Figure 1:
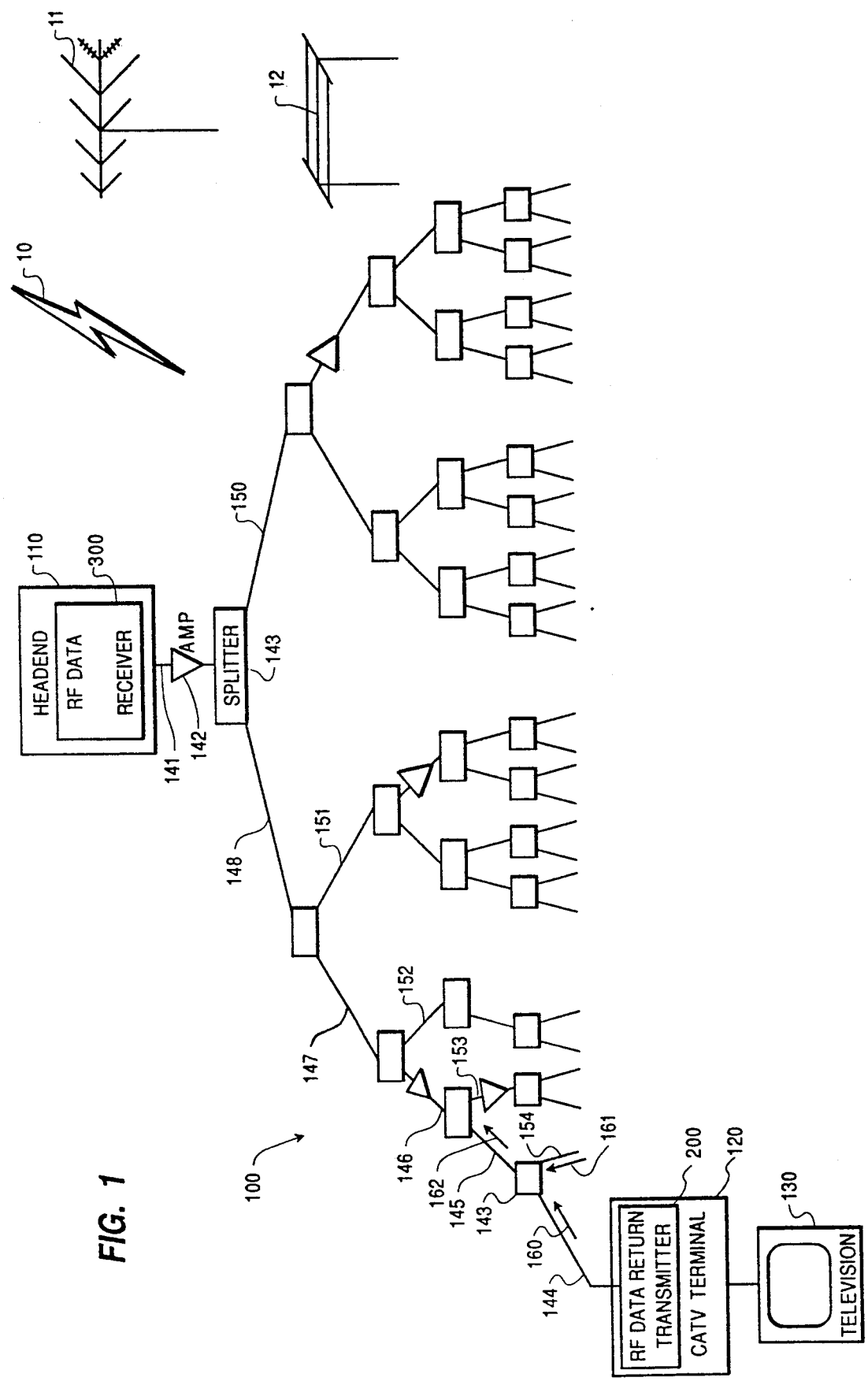
FIG. 1 is an overview block diagram depicting a cable television distribution plant with BI-DIRECTIONAL distribution amplifiers and splitters enabling connection of remote set-top terminals, which include RF data return transmitters, to a headend, which includes a frequency diverse data receiver.

FIG. 1 shows a typical cable TV distribution plant 100 for distributing cable television signals to a subscriber and for receiving upstream messages from a subscriber terminal 120. The CATV plant 100 connects a headend 110 to a plurality of subscriber's televisions 130 through CATV terminal 120. CATV plant 100 is connected in a "tree" configuration with branches 148 and 150 using splitters 143. Occasionally, at the location of splitters 143, bridger switchers are used to switch communication between headend and subscriber to only one branch of the upstream input to the splitter 143. It is one object of the present invention to eliminate any requirement for bridger switchers which have been used in the past for improving data throughput to the headend from the subscriber. In the downstream direction, a plurality of subscribers typically receive the same signal sent from the headend 110, typically a broadband CATV signal. In future systems with increased bandwidth such as optical fiber systems, it is not unlikely that different subscribers may receive different signals intended only for them, a province previously reserved only to telephone companies. Distribution amplifiers 142 are also regularly distributed along cable plant 100 to boost or repeat a transmitted signal. A transmission from headend 110 to the subscriber at CATV terminal 120 is susceptible to noise introduced along the trunk line 141 and branch lines 148, 147, 146, 145 and drop 144. However, by far the more serious noise ingress occurs in transmission from the subscriber to headend 110.

Frequency diverse RF data return transmitter 200 may be included in or associated with CATV terminal 120 and allows a subscriber to communicate with headend 110 by transmitting messages upstream in the CATV plant. Headend 110 includes frequency diverse RF data receiver 300 for receiving messages transmitted by RF data return transmitter 200 in CATV terminal 120 or in an associated module located at any or all of the plurality of subscribers. Other customers provided with IPPV or other services requiring data return may be provided with phone transmitters for communication with a phone processor (not shown) at the headend.

Many CATV plants are so-called split systems equipped for two-way transmission, that is, transmission from headend to subscriber and from subscriber to headend. In these CATV plants, amplifiers 142 are equipped for BI-DIRECTIONAL transmission including reverse path amplification. Two-way transmission in CATV plants heretofore has been avoided by cable television companies in part because upstream transmission from the subscriber to the headend is significantly more susceptible to interference noise. Upstream communication is more susceptible to interference noise because a CATV plant is configured in a "tree" configuration allowing interference noise from every point in the CATV plant to be propagated and amplified in the upstream direction. This may be referred to as the funneling effect. For instance, interference noise 160 and 161 on lines 144 and 154 will combine into interference noise 162 at splitter 143 connected to drop 144 and branch 154. As the signals travel toward headend 110, the noise will combine with noise on branch lines 153, 152, 151, 150 and every other line in the entire CATV plant. In the upstream direction, it can become difficult to discriminate a transmitted data signal at headend 110 from the noise induced in each branch of the CATV plant.

Interference noise can include impulse noise, common mode distortion, ingress and amplifier non-linearities. Lightning 10, radio broadcasts 11, and power lines 12 are exemplary sources of interference noise. CATV plants may contain old and faulty grounded and bonded cable sheaths or the like which allow noise to enter anywhere in the CATV plant. Aging splitters 143 or old, non-linear amps 142 may also cause interference noise. Because interference noise from each and every branch of the CATV plant affects upstream transmission while interference noise along only a single downstream line (for example, 141, 148, 147, 146, 145, 144) affects downstream transmission, an upstream CATV plant as it ages will require costly maintenance sooner than a downstream CATV plant. The present invention allows transmission of upstream communication signals on an "imperfect" CATV plant where upstream transmission was heretofore difficult without costly routine maintenance of the CATV plant. The present invention allows BI-DIRECTIONAL transmission of messages in a CATV plant much noisier than heretofore possible. The amount of noise found in a typical cable television plant at various frequencies is described in copending U.S. application Ser. No. 07/562,675 filed on Aug. 3, 1990, and entitled "Cable Television Radio Frequency Return Method," which is incorporated herein by reference.

Figure 2:
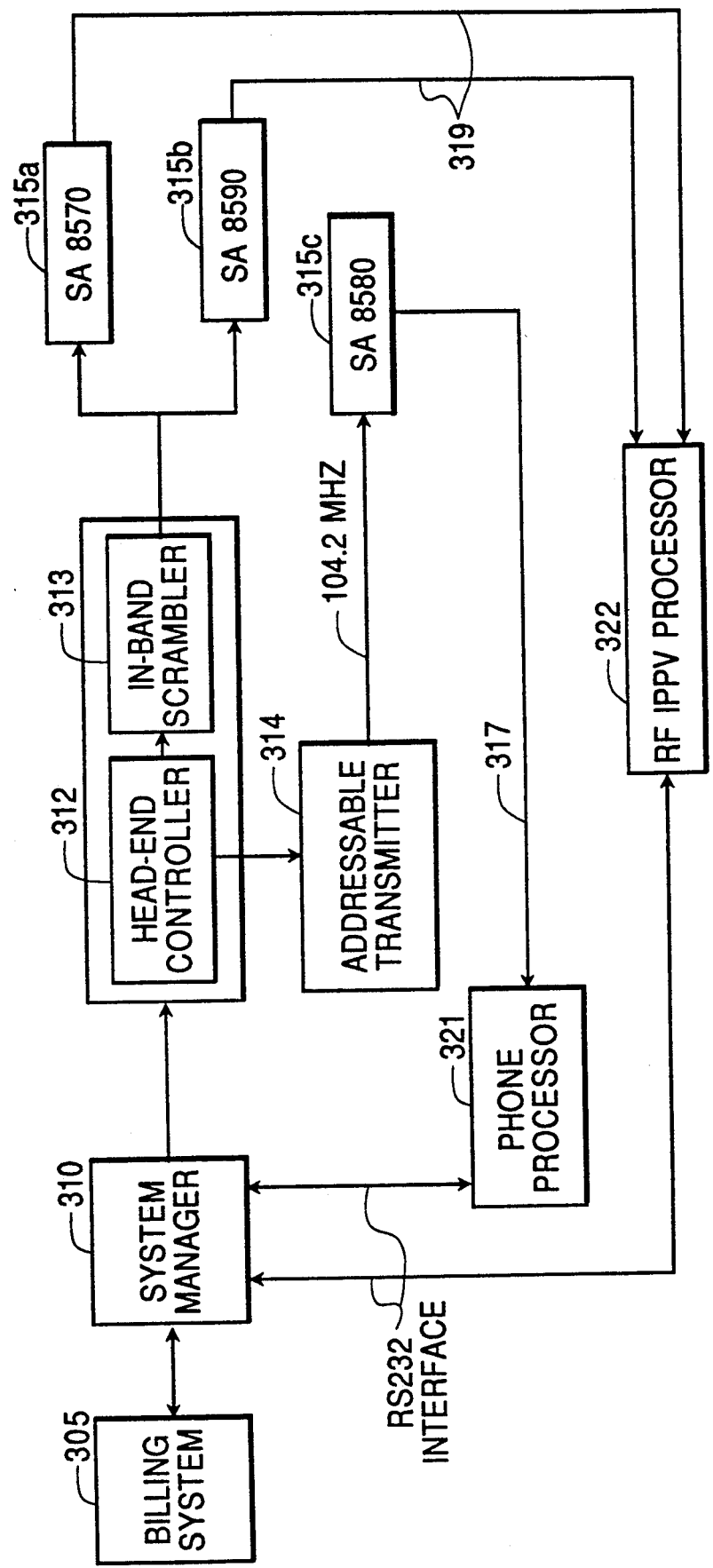
FIG. 2 is a system block diagram showing the several components of a system according to FIG. 1, including a billing system, the system manager, the frequency diverse RF data return receiver, and a set-top terminal and its associated RF data return module.

FIG. 2 is an overview of the RF-IPPV system in accordance with the present invention. The system includes a billing computer or system 305 which records and maintains records for each system subscriber.

The records typically contain information such as the subscriber's name, address, and telephone number, the type of equipment the subscriber has in his possession, and which pay services the subscriber is authorized to view. In accordance with the present invention, the records may contain information relating to age, sex, marital status, income level, credit history, etc. of subscribers which could be used in conjunction with an identification code that a subscriber enters at the remote terminal before watching a particular television program. This information could prove useful to the cable operator or advertisers in helping to effectively market their television programming.

Typically, the cable operator either owns the billing computer, leases the equipment from a vendor who specializes in this type of equipment, or shares computer time on a machine owned by a billing vendor.

Billing computer 305 is interfaced to system manager 310. System manager 310 controls the operation of the cable system. System manager 310 is typically a personal computer such as an HP 1000 A400 Micro 24 Computer or an HP 1000 A400 Micro 14 Computer having program memory for algorithm storage. Preferably, the system manager comprises a System Manager IV or V or the Subscriber Manager V which are available from the assignee of the present application. System manager 310 maintains a list of all the addressable set-top terminals in the cable system as well as those services which each terminal is authorized to receive. System manager 310 also defines and maintains the parameters selected by the cable operator for each system. These parameters may include the frequencies associated with each CATV channel in the system, which channels are being scrambled, the security features of the system, and the system time. Additionally, system manager 310 is responsible for the authorization and deauthorization of pay-per-view events in the system.

System manager 310 also stores IPPV information. A resident program of the system manager reads the IPPV transactions uploaded from the set-top terminals in the cable system. The IPPV transactions are stored in a data base of the system manager until they are retrieved by billing computer 305. System manager 310 controls the reporting back of IPPV purchase information by transmitting data requests to the set-top terminals in the cable system.

As illustrated in FIG. 2, commands generated by the system manager may be transmitted to the set-top terminals in one of two ways. In a first technique, an addressable transmitter (ATX) 314 transmits the commands from system manager 310 (optionally via headend controller 312) on a dedicated channel (e.g. 104.2 MHz) in a format recognizable by the addressable set-top terminals. In a second technique, the commands are transmitted using a so-called in-band system where the commands are included in the video signal via the action of in-band scrambler 313. An in-band system is described in commonly assigned copending application application Ser. No. 188,481, incorporated by reference herein. Other techniques may be used as well for addressably or globally transmitting data from the headend to the subscriber set-top terminal, and the present invention should not be construed to be limited in this respect. For example, data under audio, data over audio, spread spectrum, or other techniques may be implemented over the same cable or an equivalent group of alternatives may be implemented over a switched or private telephone or power line.

Subscribers in the cable system may be provided with a set-top terminal 315. FIG. 2 illustrates three set-top terminals, two of which (315a, 315b) are associated with the in-band system and one of which (315c) is associated with the out-of-band system. For example, set-top terminals 315a and 315b may comprise Scientific Atlanta Model 8570 and 8590 set-top terminals while set-top terminals 315c may comprise a Scientific Atlanta Model 8580 set-top terminal. The set-top terminal allows the subscriber to tune and descramble the services requested from the cable system operator. Each set-top terminal includes a unique digital identifier, such as a digital address, which permits the cable operator to send commands directly to an individual set-top terminal. These commands are called addressable commands. The set-top terminals are also capable of receiving global commands processed by all the set-top terminals in the cable system. Subscribers who are authorized to purchase impulse-pay-per-view events are issued set-top terminals with an impulse module included therein. Briefly, the impulse module allows the subscriber to authorize his set-top terminal to receive a pay-per-view event, store the data associated with the purchase of the event, and forward the stored data to the cable operator. As indicated in FIG. 2, the stored data may be transferred back to the cable operator by a telephone impulse module using the public switched telephone network 317 via phone processor 321 or by an RF impulse module using an RF return path 319 via RF-IPPV processor 322. The RF data return path will be discussed in greater detail below. Phone processor 321 and RF-IPPV processor 322 are coupled to system manager 310 through an appropriate interface, such as an RS-232 interface.

Billing computer 305 transmits a transaction to system manager 310 which identifies whether a particular set-top terminal in the system utilizes RF return path 319 or utilizes the telephone return path 317. System manager 310 then downloads a transaction to set-top terminal 315 to enable and configure the set-top terminal. For example, an RF impulse module must be loaded with the frequencies it will utilize for the RF transmission and calibration procedures described in detail below. These frequencies may be placed in the module at the time of manufacture or may be loaded with a global transaction from system manager 310. Alternatively, the frequencies may be loaded by an addressable command.

After the system manager downloads a configuration transaction to the set-top terminal, additional transactions to set the real time at each set-top terminal may be downloaded. As will be discussed below, the set-top terminal utilizes an internal real time clock in the present invention, and in order to maintain a high degree of precision, periodic refresh transactions from the system manager may be utilized.

Figure 3:
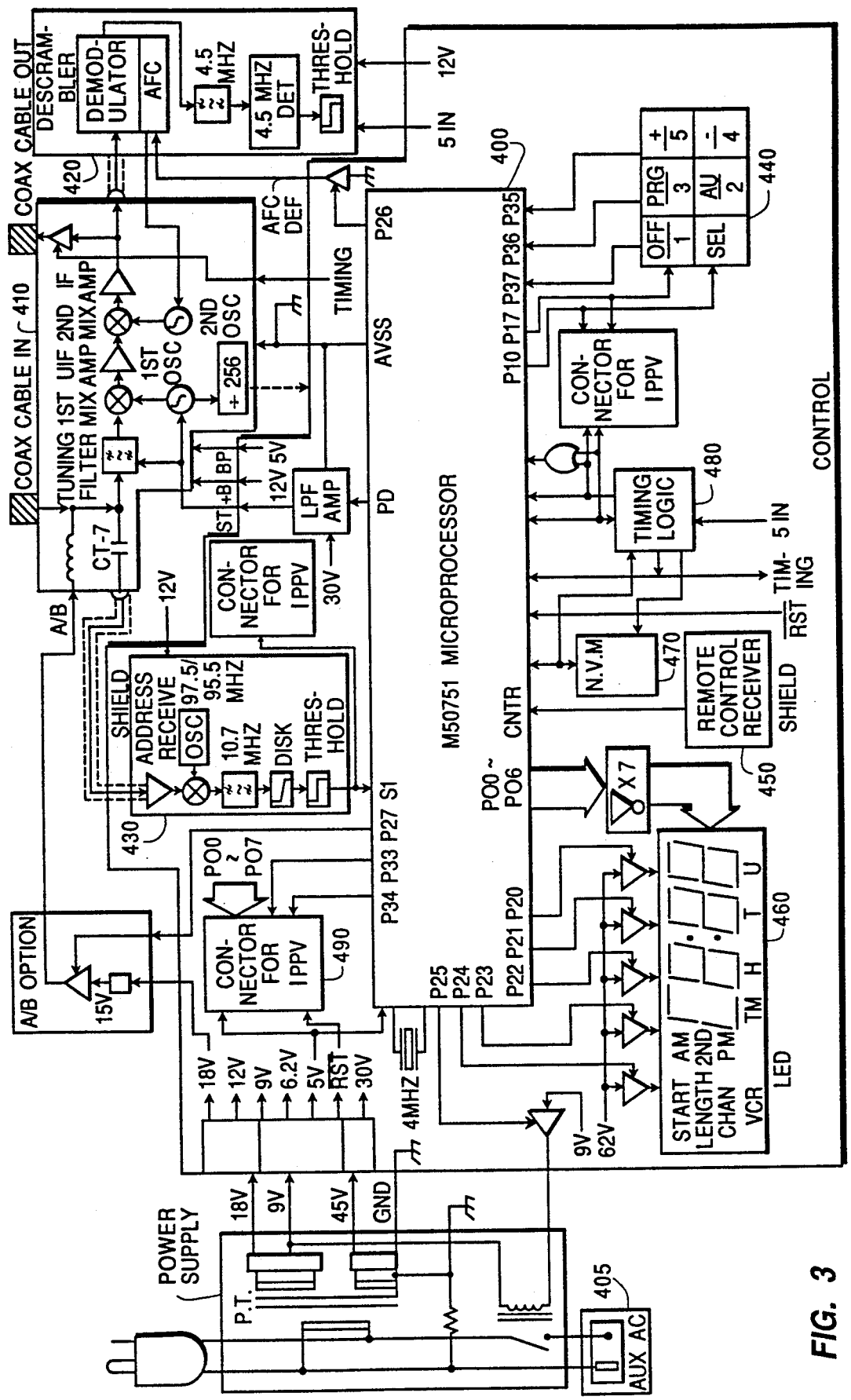
FIG. 3 is a schematic block diagram of a typical set-top terminal, the particular terminal shown comprising an out-of-band addressed command receiver.

FIG. 3 illustrates a block schematic diagram of a conventional addressable set-top terminal known in the art, namely, a Scientific Atlanta 8580 set-top terminal. According to the principles of one embodiment of the present invention, the set-top terminal is a passthrough device for passing television signals through to a television receiver. Through a port of microprocessor 400, microprocessor 400 reports all commands received through addressable data receiver 430 to a microprocessor 504 of an associated RF-IPPV data return module illustrated in FIG. 4 via IPPV connector 490. In an alternative embodiment, the functions of microprocessor 504 of the module of FIG. 4 may be incorporated into microprocessor 400, in which instance a larger capacity microprocessor than a M50751 would be required.

The basic building blocks of an out-of-band addressable set-top terminal are a down converter and tuner 410 for receiving and down-converting the incoming cable signal. The data receiver 430 accepts a down-converted out-of-band 104.2 MHz or other appropriate data carrier from the down-converter 410. The down-converted television signal output of the down-converter is descrambled at descrambler 420 as necessary. The descrambled channel is up-converted to channel 3 or channel 4 for input to a subscriber's television, video tape recorder or other subscriber apparatus (not shown).

Microprocessor 400 has associated NVM 470 and timing logic 480, a keyboard 440 for accepting direct inputs such as parental guidance codes, volume control and channel selection, an infrared or other remote receiver 450 for receiving remote control inputs, and a display 460. The display shows tuned channel number or time of day, for example.

Figure 4:
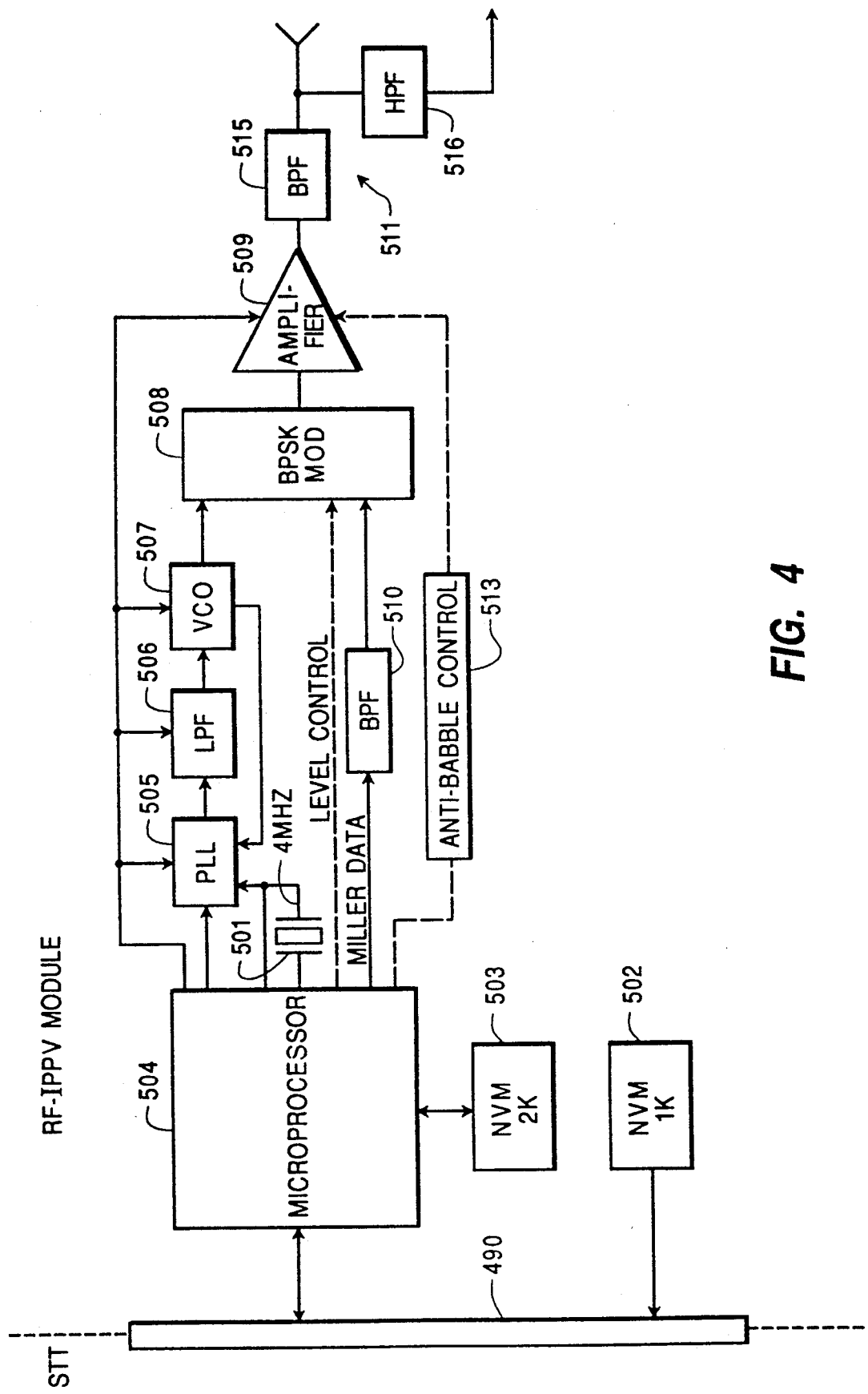
FIG. 4 is a schematic block diagram of an RF-IPPV module for the set-top terminal of FIG. 3, the module either comprising a part of the terminal or being connected to the terminal through an appropriate bus system.

The Model 8580 set-top terminal as described above is a pass through device for the purposes of the present invention. Each of Models 8570, 8590 and other set-top terminals of other manufacturers normally comprise processor controllers like microprocessor 400 which all must have ports or connectors for data exchange with a module as shown in FIG. 4 or for controlling the elements of FIG. 4 when the module does not include a microprocessor. NVM 502 of FIG. 4 is adjunct non-volatile memory which simply supplements the amount of memory provided by NVM 470 and is accessed by microprocessor 400.

In order to accomplish home shopping, energy management, meter reading, burglar alarm and other services besides IPPV service, a terminal must comprise appropriate interferences for data input/output to various principal devices in the subscriber's home (none of which are shown in FIG. 3).

FIG. 4 illustrates a block diagram of an RF-IPPV module in accordance with the present invention. The RF-IPPV module is a microprocessor-based BPSK transmitter used to send information through the reverse or upstream system of a CATV plant from a subscriber's location to the headend. Microprocessor 504 interfaces with set-top terminal microprocessor 400 to receive information to be stored in NVM 503 (for later transmission) or to receive transmission instructions. During the transmit cycle, microprocessor 504 switches on power to the frequency synthesizer circuitry, programs the appropriate frequency to transmit, turns on the final amplifier, sets the predetermined gain level at the modulator, and transmits the required information.

Microprocessor 504 is the "brain" of the module, determining when to transmit (based on instructions sent from the headend and discussed in greater detail below), determining and setting the frequency and power level of transmission, and encoding the data stored in NVM 503 for transmission. In order to assure prompt and efficient data return, data is preferably preformatted when stored in NVM 503. Upon completion of transmission, microprocessor 504 also switches the RF circuitry off, thus reducing the noise output of the module and reducing the overall power demand. NVM 503 stores the event data (preformatted for transmission), security information, transmit frequencies and power levels, and module identification information. NVM 503 also stores viewing statistics data corresponding to the particular viewers watching the accompanying television set or the status of the television set itself, as will be described in more detail below.

Phase-lock loop 505, low-pass filter 506, and voltage controlled oscillator (VCO) 507 synthesize the frequency which is used for transmission. The frequency is synthesized from a 4 MHz crystal clock 501 which also controls microprocessor 504. This arrangement reduces the number of parts required to complete the synthesis, as well as eliminates problems that could result from utilizing two different clocks of the same frequency.

Phase-lock loop 505 of the module accepts serial data from microprocessor 504 to set its registers for a particular frequency. Phase-lock loop 505 compares a sampled signal from the output of VCO 507 with a signal derived from 4 MHz clock 501 to determine whether the generated frequency is higher or lower than the programmed synthesizer frequency with a polarity representing a "high" or "low" generated frequency. LPF section 506 performs a mathematical integration of this signal, and generates a DC voltage to control the output frequency of the voltage-controlled oscillator VCO 507. The output of VCO 507 is fed to modulator 508, and also fed back to phase-lock loop 505, so it can be sampled again, and the process is repeated for the duration of transmission.

Data filter 510 is a band-pass type filter that prevents the high frequency energy of the digital information to be transmitted from being modulated into the RF carrier. Data filter 510 thus functions to contain the modulated energy of the modulated signal within specified limits.

Modulator 508 accepts filtered data input from microprocessor 504 and an RF carrier from VCO 507 and modulates the phase of the RF carrier proportional to the data signal. The modulator also utilizes a DC bias voltage created by a resistive D/A network to control the overall gain of the modulated signal. The D/A network is controlled directly by microprocessor 504. Modulator 508 is described in greater detail below with reference to FIG. 6.

Three modulation schemes for RF data return were considered for implementation in the present invention: Binary Frequency Shift Keying (FSK), Binary Phase Shift Keying (BPSK), and Direct Sequence Spread Spectrum (DSSS) with BPSK modulation. Many schemes were considered too complex, and unnecessary, since bandwidth conservation is not a critical requirement.

Of the three, BPSK has the greatest immunity to broadband noise, DSSS has the greatest immunity to discrete frequency interference, and FSK is the simplest to implement. On the other hand, BPSK and FSK have little immunity to strong co-channel interference, but a DSSS receiver is fairly complex, and has a very large noise bandwidth. Also, a DSSS transmitter requires a very complex filter to prevent interference with both forward and reverse video. In addition, FSK receivers suffer (in this case) from "capture" effect which is a problem in this situation.

The system according to the present invention provides some of the best features of each. The system uses BPSK signalling on four different frequencies. This approach may be named Frequency Diversity BPSK (or FDBPSK). In this way, the noise bandwidth of the receiver is very small, the inherent noise rejection characteristics of BPSK are utilized, and, by judicious selection of frequencies, discrete interference is avoided. However, while BPSK modulation has been utilized in the present invention for the above reasons, other modulation techniques may be utilized and the invention should not be limited in this respect. A complete description of BPSK modulation is contained in copending U.S. application Ser. No. 07/562,675 filed on Aug. 3, 1990, and entitled "Cable Television Radio Frequency Return Method," which is included herein by reference.

Final amplifier 509 amplifies the resultant signal from modulator 508 to the required output power level of the module. The amplifier gain is at a fixed level, with a signal from anti-babble control 513 controlling the on/of f switching of amplifier 509.

Anti-babble control 513 is a circuit designed to allow microprocessor 504 to control the status of final amplifier 509. In the case of a failure of microprocessor 504, anti-babble control 513 inhibits final amplifier 509 after a predetermined period of time, or after several consecutive transmissions. This prevents the module from transmitting messages longer than designed, or more frequently than intended regardless of microprocessor state. Terminals which "babble" or "scream" are terminals which are out-of-control and generate noise messages which can tie up a whole system if permitted. An anti-babble circuit prevents babble by turning off a data transmitter after a predetermined period of time which is longer than the longest data message should require. The anti-babble control 513 is described in commonly assigned U.S. Pat. No. 4,692,919 which is incorporated herein by reference thereto.

Diplex filter 511 is a filter with two distinct components: A 12-19 megahertz band-pass filter 515 for harmonic energy rejection of the module transmitter and a 54-870 megahertz high pass filter 516 for CATV signals to be passed to the set-top terminal undisturbed.

The design considerations associated with design of an RF-IPPV module for so-called "on-premises" systems are not particularly appropriate for design of so-called "off-premises" systems. The "on-premises" systems, for example, relate to in-band and out-of-band addressable set-top terminals such as the Scientific Atlanta 8570, 8580 and 8590 terminals. The "off-premises" environment presupposes the removal of set-top terminal equipment from the subscriber's premises. Such "off-premises" systems include, for example, interdiction and trap technologies. Consequently, for example, there is at least a house, if not a drop, cable separation between the cable television terminal and the subscriber equipment which may not be particularly suitable for data communication. On the other hand, some subscriber equipment is required for IPPV, home shopping and such two-way services not available with conventional television receiver apparatus. Consequently, the module of FIG. 4 which presupposes a bus or other inter-terminal/module communication path would be difficult to implement over conventional house or drop cables without some special data communication design. The present invention, then, is related to those principles of terminal/module design which may be extended from the design of an on-premises terminal to the design of an IPPV module for so-called off-premises interdiction and trap system subscriber units.

The operation of the various above-described components in accordance with features of the present invention will now be described.

As discussed above, to report IPPV event purchase information back to system manager 310, each set-top terminal or STT 315 must have a reverse communication path (as opposed to the forward path used to send control information from system manager 310 to STT 315). As mentioned earlier, an RF-IPPV system is intended to be used in cable plants which have reverse sub-split channel capability. These cable systems have trunk amplifiers which allow the T7, T8, T9, and T10 (approximately 0–30 megahertz) channels to propagate in the reverse direction, i.e. into the headend.

Figure 5:
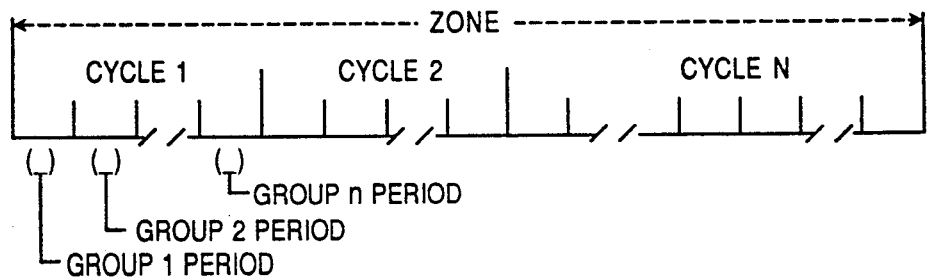
FIG. 5 is a diagram of the timing for the data return sequence from a frequency diverse RF data return transmitter according to FIG. 4.

The present invention provides an RF-IPPV module as shown in FIG. 5 which utilizes a portion of the T8 channel to communicate from the terminals or modules to a frequency diverse data receiver in the headend via a selectable plurality of modulated RF data carrier channels. Use of the T7, T9 and T10 channels for video conferencing or other communication is not adversely affected by the data communications which are generally confined to the T8 channel band.

Use of the reverse channels in a cable plant as a data communications network for retrieving subscriber information from terminal locations suffers from two primary drawbacks: the high noise and interference environment of upstream communications as discussed in detail above and a lack of an access contention mechanism through which data may contend for access to the network. Both problems stem from the topology of the system, which is an inverted tree as shown in FIG. 1.

From an interference standpoint, the branches of the "tree" can function as a large antenna network. Faulty shielding and cracked or loose connections in the cable system allow RF interference to "ingress" into the system as described above. Because the trunk amplifiers are preset to provide overall unity gain, the in-band interference and noise is regenerated at each of the amplifiers. Furthermore, in the reverse path, interference and noise from each branch is additively combined at each trunk intersection. The result is that all of the interference and noise picked up throughout the cable system is ultimately summed at the headend, where the RF-IPPV data receiver is located. To minimize these problems inherent in the use of reverse cable TV channels for data communications, a plurality of four channels of a range of twenty-three (23) 100 KHz data channels in the T8 television channel bandwidth are selected for use in the present RF-IPPV system based primarily on data throughput considerations. As will be described further herein, the present invention should not be construed as limited to four channels but may utilize more than four channels. The probability of receiving messages increases with each additional channel utilized, but the costs of providing additional transmitters and receivers for additional channels becomes prohibitive by comparison.

The 6 MHz reverse video channel is divisible into sixty 100 kHz wide communication channels, of which twenty-three (23) are utilized in a current implementation. Four of the twenty-three channels are selected based on the frequency location of noise and interference. Both the transmitters and receivers are frequency-agile. The frequencies used for reverse communication can be automatically programmed by the system manager computer to avoid channels which are noisy or contain significant interference. These frequencies can be changed as often as necessary to deal with time varying interference.

Each transmitter will successively transmit its data preferably at a data rate of 20 kilobits/second on each of the four frequencies. At the headend, four RF receivers (one tuned to each channel) are used. This arrangement provides redundancy for each message. The probability of error due to co-channel interference is now the product of the four probabilities that each of the four channels has interference present at the time of the transmitter's use of that channel. This results in a very high transmission/reception success rate.

Note that this can provide even better performance than that of spread spectrum systems, since the sequential transmission scheme provides some time diversity as well as frequency diversity.

Frequency Selection

In a typical reverse system, there are four video channels available: T7, T8, T9 and T10. Usually, the lowest channel (T7) is the noisiest and the highest channel (T10) is the quietest. This would suggest that T10 would be the best choice. However, there are other considerations which must be taken into account when selecting frequencies, and these considerations are described thoroughly in copending U.S. application Ser. No. 07/562,675 filed on Aug. 3, 1990, and entitled "Cable Television Radio Frequency Return Method," which is incorporated herein by reference.

IPPV Media Access Data Return Protocol

In the operation of an IPPV cable system, it is generally desirable to be able to request a data return message or "poll" the STTs equipped with RF-IPPV modules (RF-STTs) based on several different criteria. The following list summarizes the most useful cases for requesting data return from specific groups of STTs:
1. Unconditionally, i.e., all RF-STTs must report;
2. All RF-STTs storing IPPV data for one or more events;
3. All RF-STTs storing IPPV data for a specific event; and
4. Specific RF-STTs on an individual basis (regardless of event data).

Furthermore, as stated earlier, it is very important that, even in the first (unconditional data request) case, all RF-STTs be able to return the data within a period of no more than 24 hours. This should be possible with RF-STT populations of thousands or even several hundreds of thousands, and translates to a "throughput" goal of some twenty-five thousand RF-IPPV data responses per hour.

Each of the reverse narrow-band data channels can only carry one message at a time. That is, if two or more RF-STTs anywhere on a particular cable system send messages that overlap in time, the transmissions will interfere and all data messages involved in the "collision" have a high probability of being lost. Therefore, in three of the cases shown above, some type of media access control procedure is required to prevent a plurality of RF-STTs from attempting to use a data return channel simultaneously.

Of course, all of the cases could be handled as a series of individual data requests (like the fourth case). However, this is not consistent with the throughput goal due to system message delays incurred in the typical "round trip" request/response message sequence. It is much more efficient to send a single "group data request" to relatively large groups of RF-STTs which then return data according to a planned procedure or "media access protocol". This protocol must insure a high rate of success, that is, no collision involvement, for messages.

Unfortunately, popular media access protocols such as are used in local area networks which rely on carrier sense mechanisms to help prevent transmission collisions are unsuited for use in a cable system. The inverted tree topology of cable systems sums transmitted signals from different branches and propagates them toward the headend. RF-STTs that are located in different branches, each of which is isolated by a trunk amplifier or other device, cannot detect the presence of an actively transmitting RF-STT in another branch.

Another access protocol, time slotting, also suffers from the worst case variance in system message delays. This forces the time slot for each RF-STT to be unacceptably long, resulting in poor throughput.

All of the items above have led to the development of a media access protocol which gives an acceptably high throughput rate by having a calculated tolerance for collisions. The method utilizes the predicted statistical probability for collisions (and conversely for successful message throughput) given a controlled, evenly distributed random RF-STT data return attempt rate.

In very simple terms, this involves the system manager sending out a data request for each manageably sized sub-group of the total RF-STT population. (These subgroups are independent of the four polling cases listed above.) Each subgroup or simply "group" has a defined period of time within which to return data. Within this period, each RF-STT independently picks the programmed number of (pseudo) random data return transmission start times. For the relatively large subgroups used, the return attempts are statistically evenly distributed over the period. Furthermore, since the average attempt rate is predetermined and the average length of a return message is known, the resulting probability for at least one successful data return message for any RF-STT is predictable.

Although the above statistical concept is the basis of the data return method, a number of other key elements are required to make the process workable. These are summarized below:
1. An optimal attempt rate is determined which gives the best effective data return throughput.
2. The overall RF-STT population on each cable system headend is divided into manageable sized groups of known size. The size and number of subgroups, as well as the data return period can be determined given the optimal attempt rate.
3. A data return plan is required which provides structure to the manner in which system manager requests return data from the individual groups.
4. A set of rules governs how the RF-STTs within the groups respond to data return requests and data acknowledgments within the data return sequence.

RF-IPPV Processor Description

Figure 6:
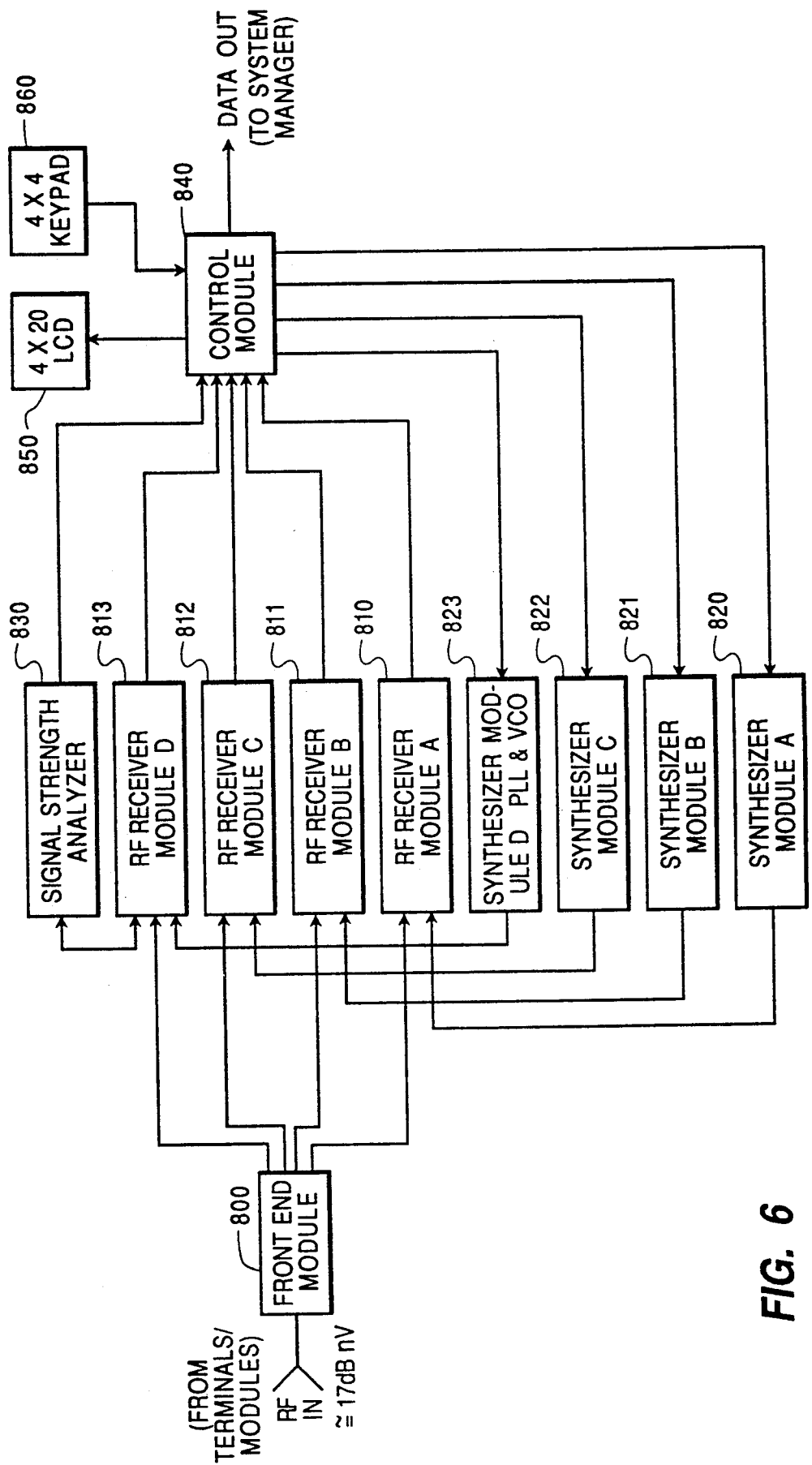
FIG. 6 is a block diagram of the RF-IPPV processor (receiver) shown in system diagram FIG. 2.

Referring now to FIG. 6, there is shown a block diagram of the RF-IPPV processor of FIGS. 1 and 3 in greater detail. The RF return signal from the set-top terminals is transmitted in the sub-VHF channel T8. The set-top transmitted carrier can be set, with 100 kHz resolution, in the frequency range of 11.8 to 17.7 MHz providing a maximum of 60 and preferably, 23 different 100 kHz bandwidth data channels to select from. The modulated carrier from the set-top terminal or module contains 20 KBPS Miller encoded BPSK information. The RF signals from the entire set-top terminal population in the system are combined and returned to the RF-IPPV processor located in the headend. The function of the RF-IPPV processor is to accept RF return input signals, demodulate the information, and supply the decoded message to the system manager.

While only data return transmission from a set-top terminal are described in any detail, the RF-IPPV processor according to the present invention may be applied for status monitoring of bi-directional amplifiers and other elements of a cable television distribution plant equipped with data transmitters. Also the RF-IPPV processor may receive signals transmitted from BERT and other test apparatus connected at any point in the cable network.

Referring still to FIG. 6, the RF return signal is typically received at a single carrier level of +12 dBmV. The RF-IPPV processor is designed to function with a range of single carrier levels of +2 to +22 dBmV. Often, more than one carrier is received simultaneously, and the total received power will be proportionally greater than +12 dBmV. If on different frequencies, the RF-IPPV processor can simultaneously receive, demodulate, and decode four modulated carriers, only the non-redundant, decoded messages are sent from the control board of the RF-IPPV processor to the system manager through the RS-232 serial interface.

The first element to be described of the RF-IPPV processor is a so-called front end module 800. The RF return signal from the terminal is routed from the incoming cable to a connector of the front end module 800 which most conveniently comprises a separate assembly. The front end module 800 offers the input signal a terminating impedance of 75 Ohms nominal. This assembly consists of a band-pass filter, a preamplifier and a power dividing network which splits the incoming RF signal to the four RF Receiver Modules A-D. The band-pass filter will pass the T8 band with negligible attenuation and distortion while rejecting out of band signals. The preamplifier compensates for filter insertion loss and power splitting losses. The RF signals are routed from RF connectors of the front end module to the four RF receivers. The front end module has approximately 1 dB of gain, so that the signal applied to the RF receivers 810–813 is approximately at +13 dBmV. All coaxial interconnections internal to the RF-IPPV processor, with the exception of the incoming RF signal are terminated in 50 Ohms nominal. A cable assembly supplying +24 Volts DC and ground is routed directly from a power supply assembly (not shown) to the front end module. The front end module 800 does not directly interface with the control board module 840. All other receiver and synthesizer assemblies in the RF-IPPV processor include an interconnection to the control board module 840.

The second primary building block of the RF-IPPV processor is the RF receiver. There are four RF receiver assemblies A-D 810–813 in the RF-IPPV processor. These are functionally equivalent units, three of which support a 50 Ohm termination in the signal strength analyzer (SSA) output port, so the units may be interchangeable. The fourth (Channel D) is shown with a coaxial interconnection to the SSA Assembly 830. The RF receiver downconverts the front end module routed signal using the frequency synthesizer output as a high side local oscillator. The synthesizer output frequency may be between 22.5 and 28.4 MHz and is preferably 26.2 to 28.4 MHz corresponding with the input frequency range of 11.8 to 17.7 MHz, or preferably 15.5 to 17.7 MHz. The IF signal is at a center frequency 10.7 MHz. Ceramic IF Filters, centered on 10.7 MHz, reject adjacent channels and other mixer products while passing the intended signal. The narrow-band filtered IF signal is then detected by a circuit which provides a rough estimate of signal strength referred to herein as Received Signal Strength Indication (RSSI). The RSSI output is a DC voltage, proportional in magnitude to the level of the received RF signal level. The RSSI voltage is routed to the control board module, along with other signals by an RF receiver interface ribbon cable assembly. The RSSI information is indicative of set-top RF return signal level as received by the RF-IPPV processor. This information is made available to the system manager.

RSSI data for a particular terminal is indicative of terminals requiring recalibration. To this end, the system manager maintain lists of RSSI "too high" or "too low" data for terminals so that unique addresses for those terminals may be queued for recalibration. Such recalibration is not periodic but performed on a higher priority basis, that is, on an equivalent priority to new terminals requiring calibration for the first time. Also, tabulated RSSI data, over a period of a time, may be used for determining slope/tilt characteristic curves for all the twenty-three channels over which messages may be sent from a particular set-top terminal. The slope/tilt characteristic curves are then downloaded to the terminal so the set-top terminal may determine appropriate transmit levels for all category one and category two channels from the optimum result for the calibration channel.

The main function of the RF receiver is to BPSK demodulate the 10.7 MHz IF signal. The signal is demodulated utilizing a double balanced mixer. The demodulated data stream is filtered and synchronized. This detected 20 KBPS Miller encoded data is routed to the control board module. The RSSI and BPSK demodulation functions are performed by each of the four RF receivers. The narrow-band filtered 10.7 MHz IF signal at an approximate level of +13 dBmV is routed from RF Receiver D to the signal strength analyzer assembly.

Associated with RF receiver operation is a signal strength analyzer 830. The function of the signal strength analyzer assembly is to detect the level of the 10.7 MHz IF signal routed from the RF receiver assembly chosen for calibration purposes. The RF receiver output does not undergo automatic gain control (AGC); as a result, any changes in RF input level to the RF-IPPV processor will result in a changing 10.7 MHz IF level to the SSA. When the RF return system undergoes calibration, by detecting the 10.7 MHz IF, the SSA provides the control board 840 an indication of what terminal/module transmit level corresponds with a received signal level of +12 dBmV. The control board 840 will in turn advise the system manager through the RS-232 interface. Until the next calibration cycle, (described in detail hereinafter) the system manager will instruct the set-top terminal to utilize the control board reported tramit signal level.

The +13 dBmV 10.7 Mhz IF signal is terminated in 50 Ohms by the SSA. Two buffer amplifiers apply approximately 30 dB of IF gain. The ampinlified IF signal is peak detected by a diode based network. A second diode based network is similarly DC biased. The two diode networks are summed to provide temperature compensation in accordance with well known techniques. The output accurately reflects the IF level, as the diode DC components cancel out. This detected signal is filtered and further amplified. The final output DC signal, proportional to the IF signal level, is routed to the control board.

The frequency synthesizer under control of the system manager synthesizes frequencies for demodulating the incoming data carriers. The frequency synthesizer is the local oscillator for the single frequency conversion performed in the RF Receiver. A single frequency synthesizer assembly contains four discrete units 820-823. The control board 840 supplies, through serial data commands, frequency tuning information. The four frequency synthesizer units 820-823 are labeled frequency synthesizers A, B, C, and D, to correspond with the four RF receivers 810-813. There are a total of sixty frequencies in the T8 channel bandwidth that can be set by the control board 840; however, according to the present invention, only 23 are used. The output frequency range is preferably 25.1 to 28.4 MHz and is down-converted to the upper portion of the T8 band, i.e., 14.4 to 17.7 MHz. The frequency resolution is 100 kHz. The output signal is at a typical level of +17 dBm.

Each frequency synthesizer unit contains an oscillator, frequency divider, phase locked loop (PLL), an integrated circuit (IC), and an active loop filter. These components together form a phase locked loop. The output frequency of the oscillator is phase and frequency coherent with a free running 4 Mhz crystal oscillator. The PLL assures that the synthesizer output will be spectrally pure and frequency accurate. The oscillator output drives a push-pull amplifier. The push-pull design is utilized to supply the required +17 dbm local oscillator level.

Figure 7:
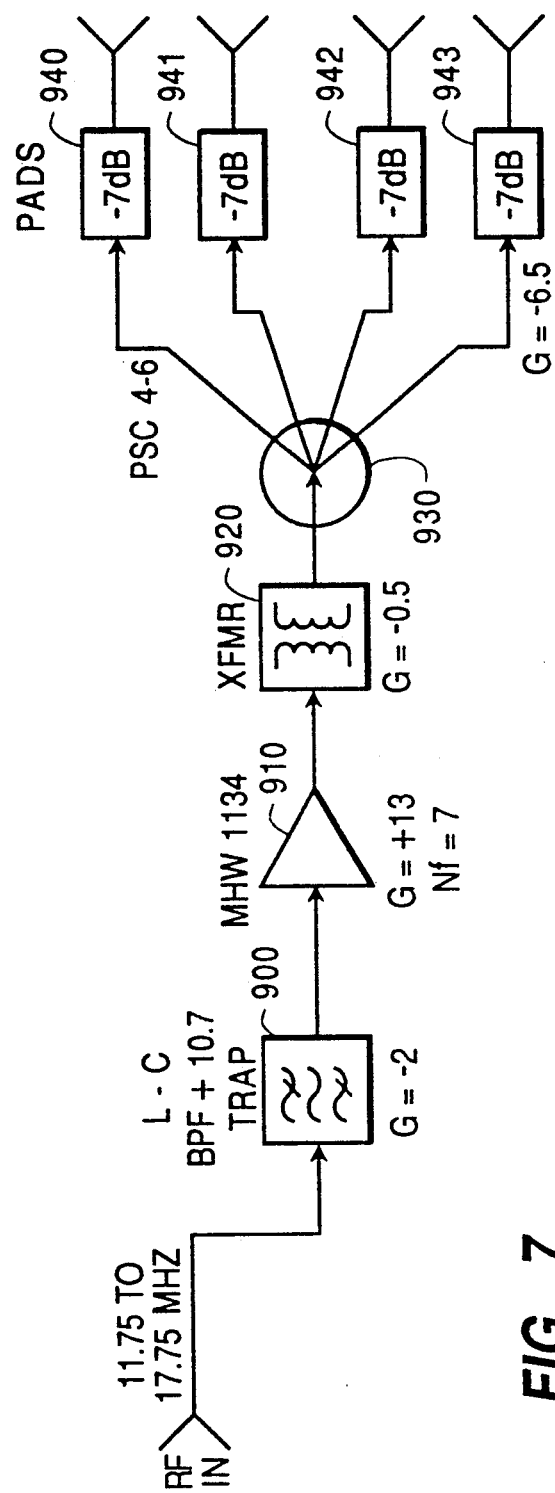

The front end module is shown in block diagram form in FIG. 7. The front end/power divider module consists of a band-pass preselector filter 900, a preamplifier 910 consisting, for example, of a MHW1134 and a dividing network 930 to supply four RF receiver modules. Gains through the module including transformer 920 are shown listed below each element.

Figure 8:
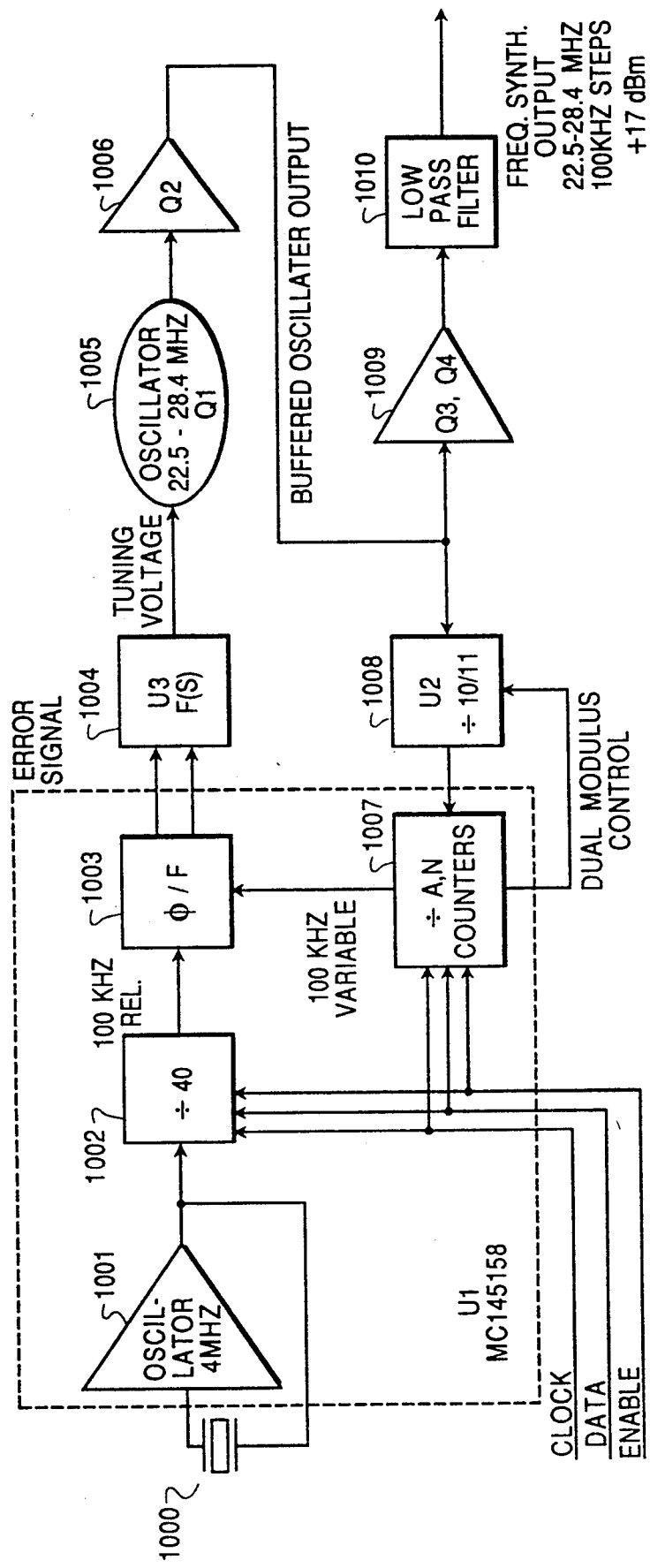

Referring now to FIG. 8, the frequency synthesizer assembly of the RF-IPPV processor will be described in further detail. The frequency synthesizer assembly contains four PCB sub-assemblies as per FIG. 8. Each of the sub-assemblies is set to frequency by the RF-IPPV processor's control board 840. The range of the frequency synthesizer is preferably from 26.2 MHz to 28.4 Mhz but may be as wide as 22.5 to 28.4 MHz. The tuning resolution is 100 kHz. Each of the four frequency synthesizer sub-assemblies can be set to any of the 60 channels in the 22.5 to 28.4 MHz range. The RF output of the frequency synthesizer sub-assembly is the local oscillator signal of one-of-four RF receivers in the RF-IPPV processor. The local oscillator is high side, so that the RF range of 15.5 to 17.7 MHz is down-converted to the receiver IF of 10.7 MHz. FIG. 8 is a block diagram of the frequency synthesizer subassembly. Again, there are four such sub-assemblies in the frequency synthesizer assembly.

A 4 MHz fundamental mode crystal 1000 is connected to a high gain feedback amplifier 1001. The amplifier is part of PLL (Phase Locked Loop) LSU (Large Scale Integration) device, U1, preferably a Motorola MC145158. The 4 MHz output signal is routed within U1 to a frequency divide 40 counter 1002. The output of the counter is a 100 kHz reference signal which is routed within U1 to a phase/frequency detector 1003.

The phase/frequency detector 1003 compares the two input signals (100 kHz reference and 100 kHz variable), and generates error signal pulses when the two inputs are not at the same frequency and phase. These pulses tune the oscillator such that the 100 kHz variable frequency signal is forced to the same frequency and phase as the 100 kHz reference signal. When this occurs, the frequency synthesizer output will be at the correct frequency. The differential error signals from the phase/frequency detector 1003 are routed from U1 to loop filter U3 1004 and associated components. U3 filters the error signals, and converts it to a single ended tuning voltage that steers the oscillator 1005. The oscillator 1005 is composed of Q1 and associated components. The oscillator 1005 is designed such that tuning voltages at the input result in output frequencies that contain the desired output range of 22.5 to 28.4 MHz or more preferably 26.2 to 28.4 MHz. The oscillator output is routed to buffer amplifier Q2 1006. The buffer amplifier 1006 offers a relatively high impedance, and isolates the oscillator from dual modulus divider U2 1008, and power amplifier Q3, Q4 1009. The buffered oscillator output signal is routed to dual modulus divider U2, where the frequency is divided by 10 or 11. Programmable divider U2 together with dividers A and N 1007 form a total divide by ratio $N_t = 10 \times N + A$. Counters N and A are programmed by the control board 840, through serial data commands, of the RF-IPPV processor such that $Fout = Nt \times 0.1$ MHz. For example, the control board sets $N_t$ to 250 for an output frequency of 25.0 Mhz. $N_t$ can be set by the control board for any one of sixty values between 225 and 284 but preferably between 251 and 284. The function of the dual modulus control line is to establish when U2 will divide by ten, and when it will divide by 11.

Buffer Amplifier Q2 also drives power amplifier Q3, Q4 1009. There is a potentiometer adjustment utilized (not shown) such that the output signal level is approximately +17 dBm. The power amplifier is followed by a low pass filter 1010 that attenuates primarily the second and third harmonic of the synthesizer output signal. The +17 dBm frequency synthesizer output is routed to an associated RF receiver assembly of the RF-IPPV processor.

Figure 9A:
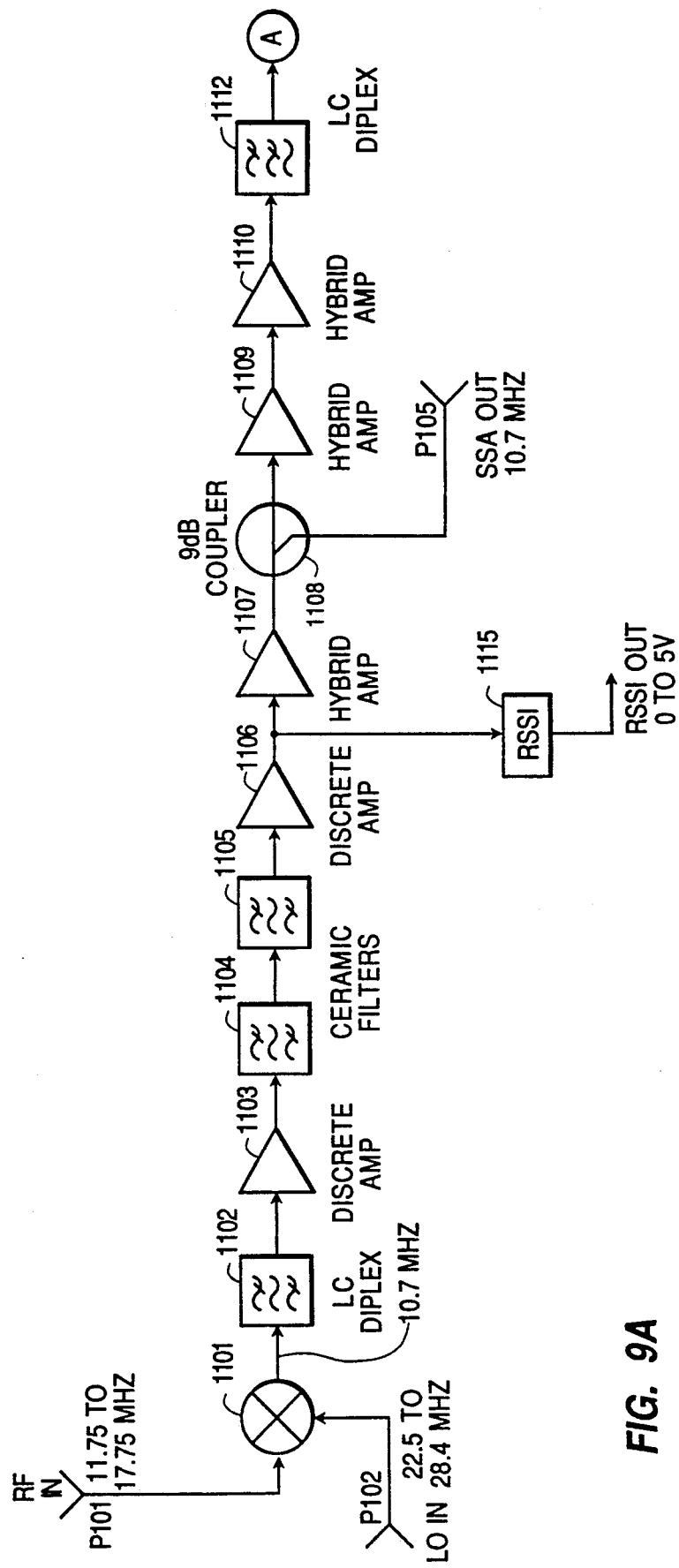
Figure 9B:
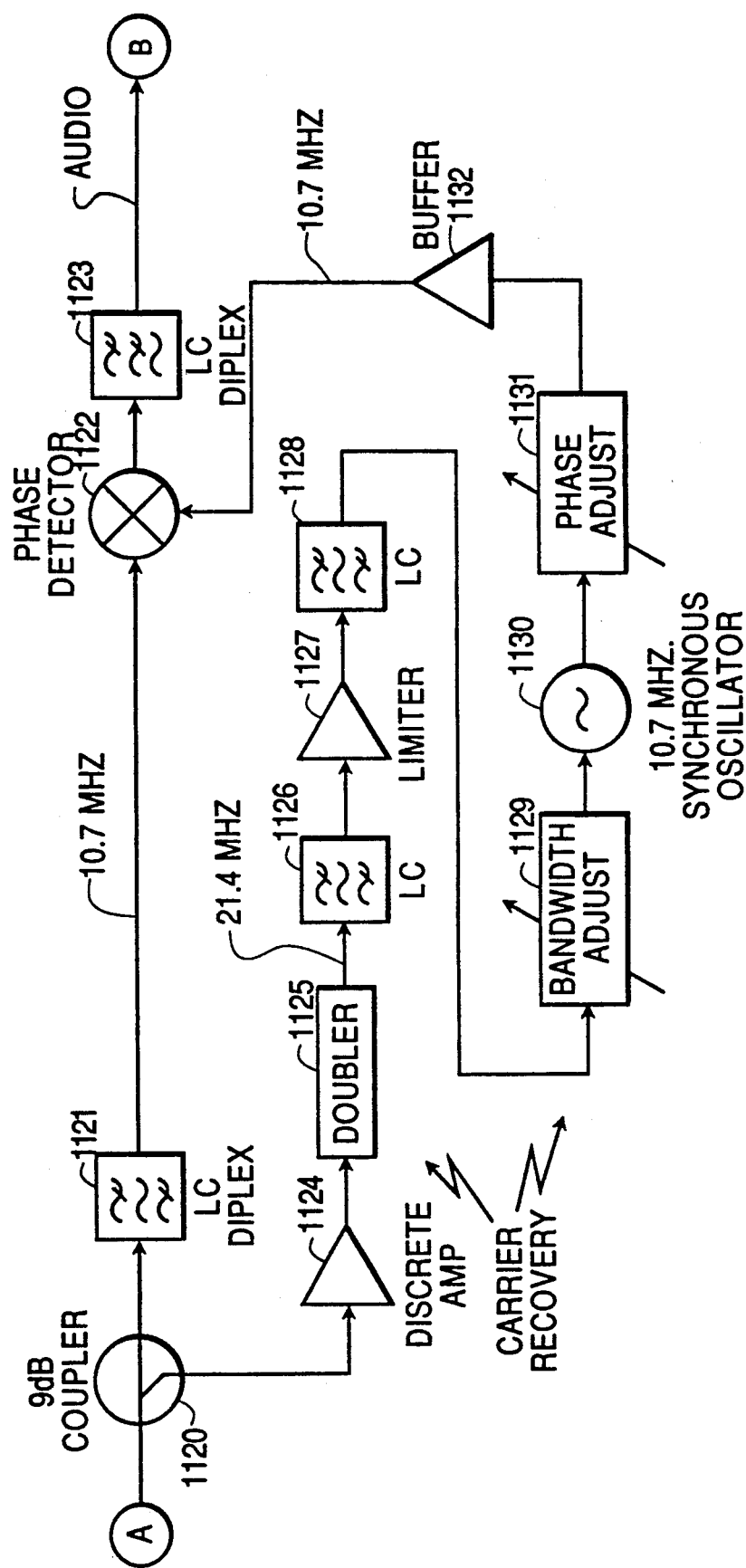
Figure 9C:
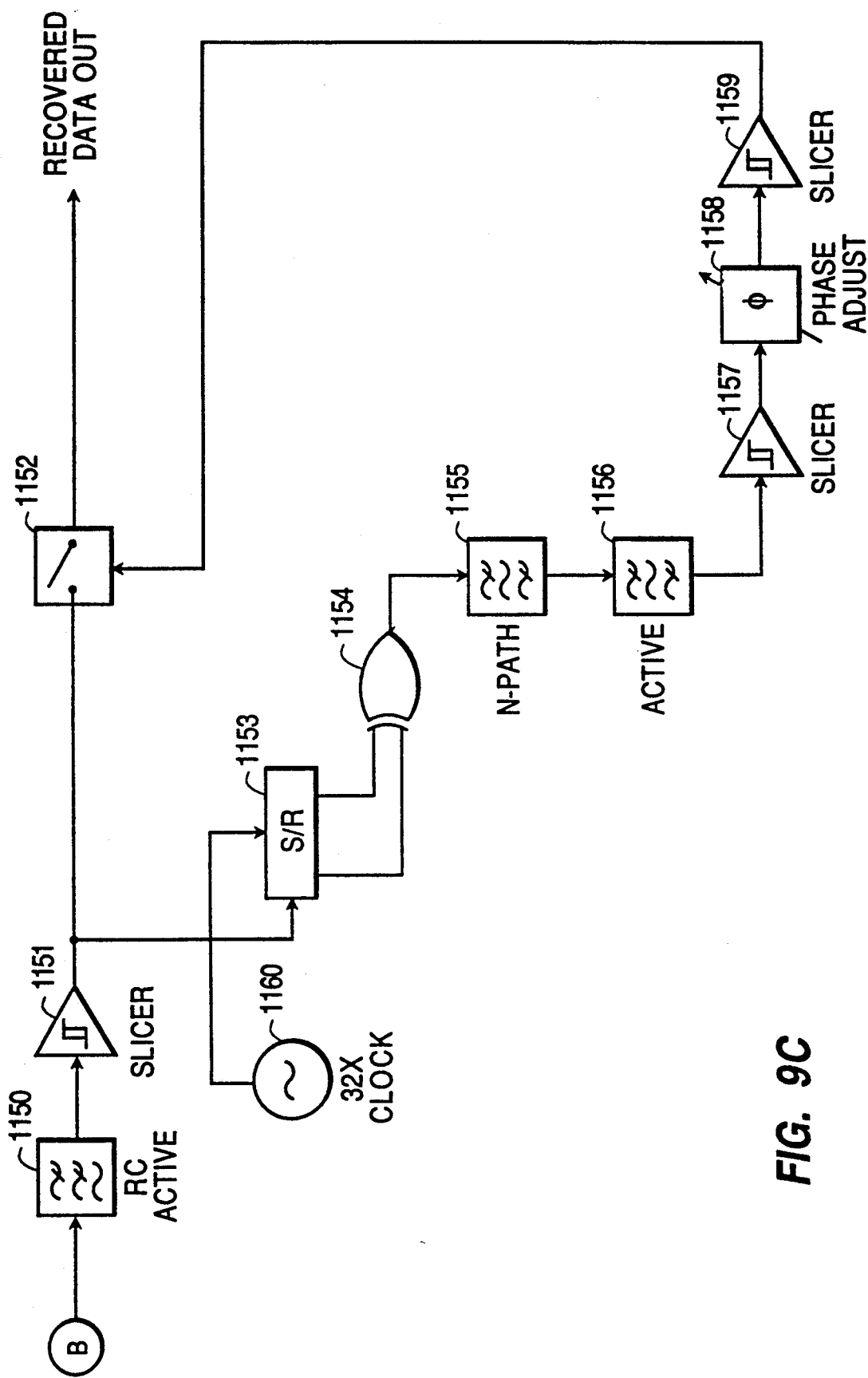

The RF receiver module is shown in block diagram form in FIGS. 9A-C. There are four separate RF receiver (RFRX) modules. Referring first to FIG. 9A, each RF receiver contains a mixer 1101 to convert the input signals to an IF frequency of 10.7 MHz. High-side injection is used. The IF signal is passed through ceramic filters 1104, 1105 to reject adjacent channel signals and distortion products.

The IF is then passed through an amplifier 1106 and level detector 1115. The detector circuit provides a rough estimate of signal strength (RSSI). The detector circuit 1115 is constructed, for example, from an NE60-4AN in a well known manner. The RSSI output is an analog voltage which is sent to the controller/processor module 840 for digitalization and transmission to the system manager.

The IF is then passed through a directional coupler 1108. The tap output is routed to an external port for use by the signal strength analyzer (SSA) module. The IF signal is then further amplified and directed to the demodulator.

Referring now to FIG. 9B, the demodulator preferably consists of a frequency doubler 1125 and injection-locked oscillator 1130 for carrier recovery. Data recovery, per Figure C, is achieved via a modem filter, a clock recovery circuit and sampler. The output of the demodulator is digital data.

Figure 10:
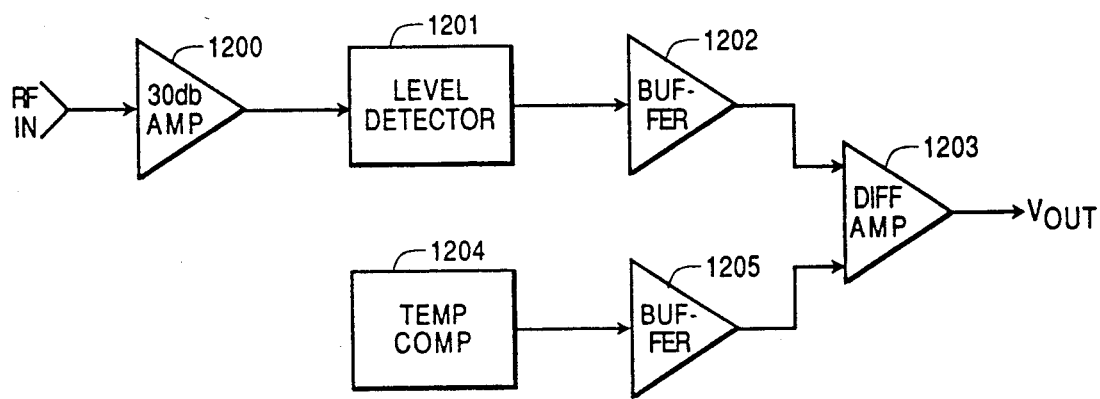
FIGS. 7-11 are schematic block diagrams of the several component assemblies of the RF-IPPV processor of FIG. 6.

Referring now to FIG. 10, the signal strength analyzer is shown which receives the signal strength indicator signal from the RF receivers. The signal strength analyzer (SSA) module is used to get a high accuracy measurement of data transmitted power. The RF signal to be measured is routed from the IF of one of the RF receiver modules, for example, channel D. The signal strength analyzer module consists of a 30 dB preamplifier 1200, level detector 1201 and a buffer stage 1202. The output is an analog voltage which is sent to the controller/processor module for digitalization and transmission to the system manager. Two separate diodes are used for temperature compensation prior to input to the differential amplifier 1203, i.e., diode 1204 compensates for diode 1201.

Figure 11:
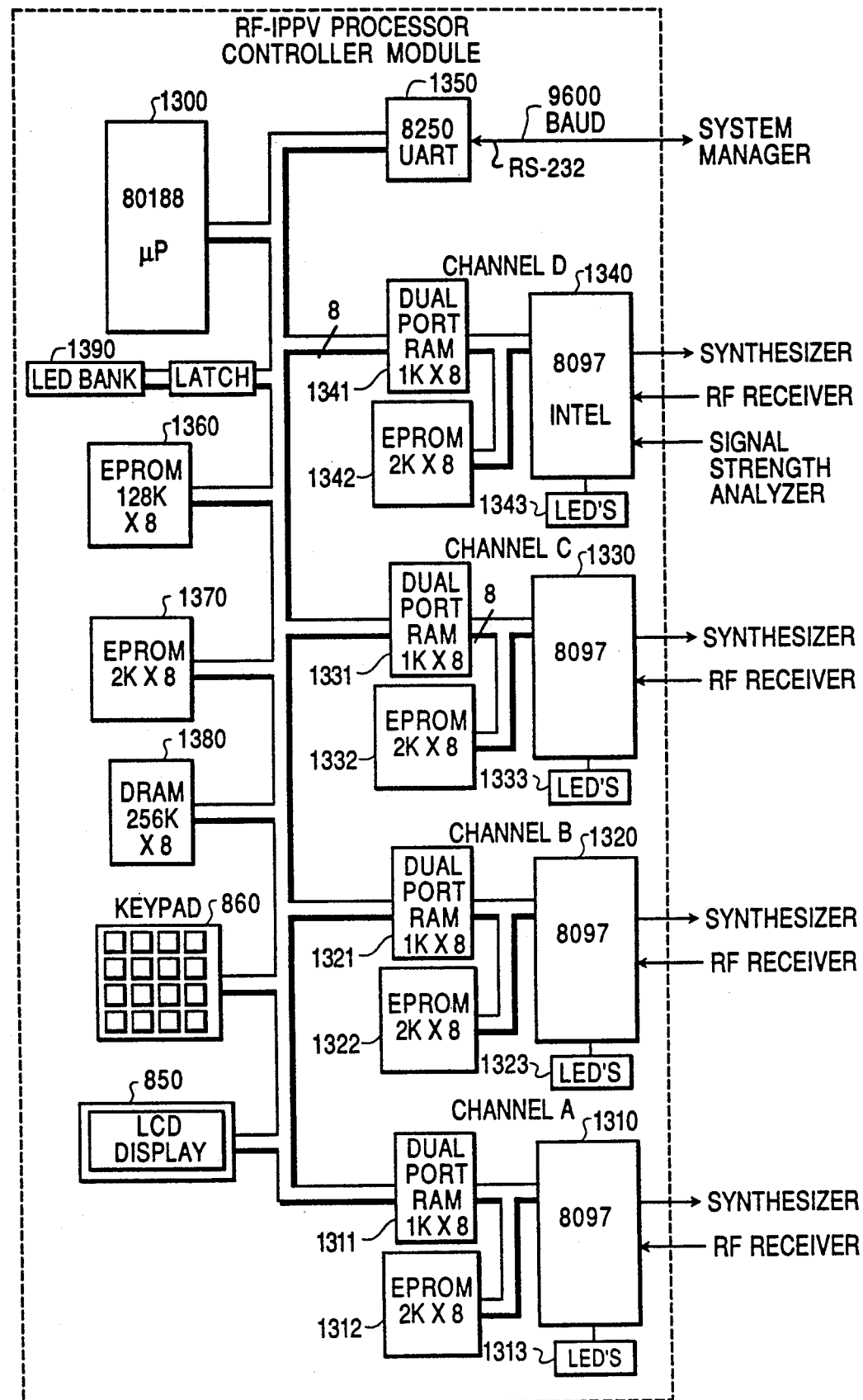
Figure 12:
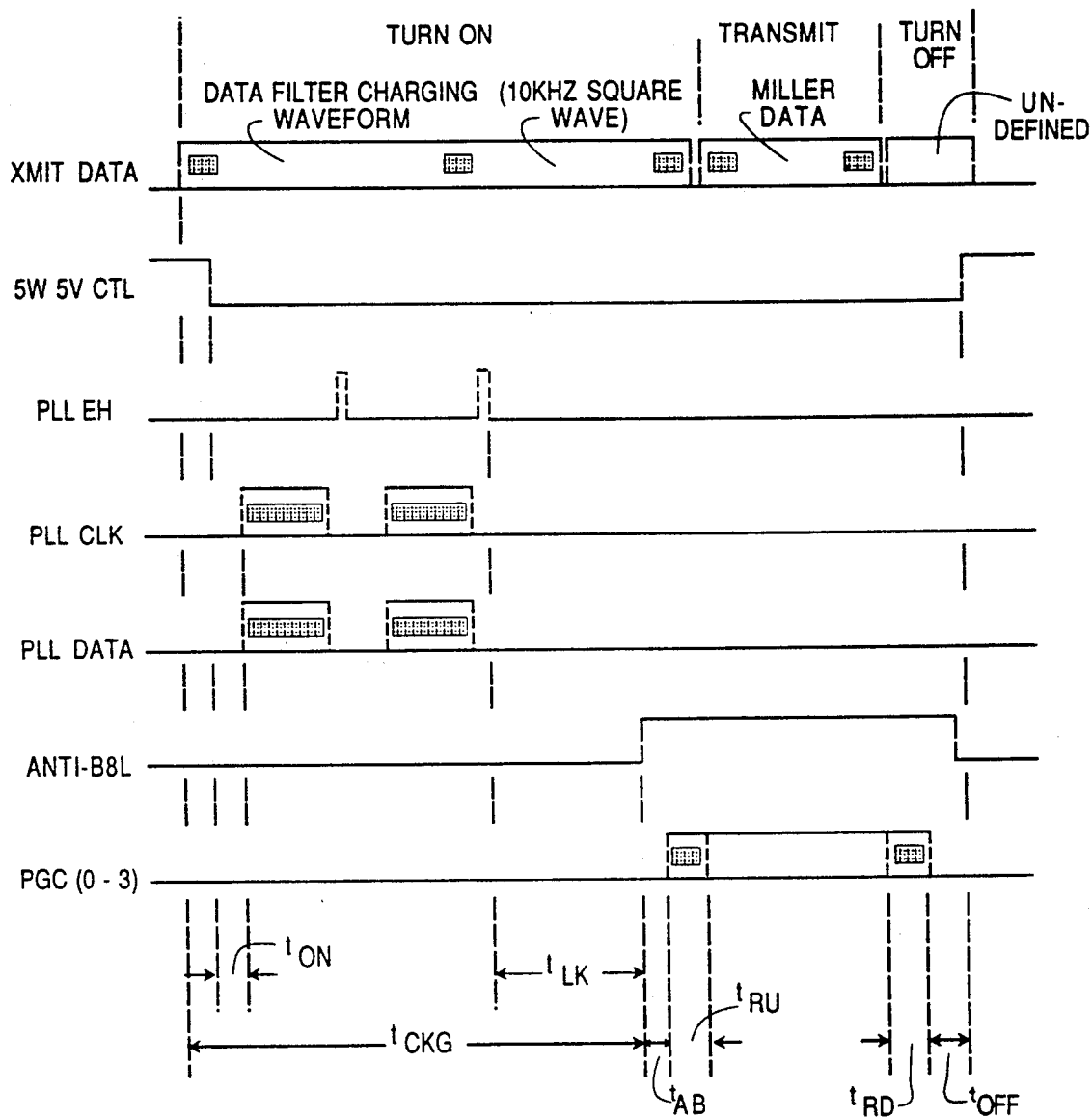
FIG. 12 is a timing diagram of an RF-IPPV data transmission sequence.

Referring now to FIG. 11, the controller module is shown which manages the operation of the RF-IPPV processor. The module configures the synthesizers, monitors signal strength, decodes messages received by the RF receivers, checks messages for validity, establishes queues for unique messages and forwards messages to the system manager. The controller module includes a user interface (keypad and display) for diagnostics, error reporting and switchless configuration.

The controller board consists of six functional blocks according to FIG. 11: an 80188 microprocessor 1300, a memory subsystem, receiver interfaces including 8097 processors and dual port RAMS for each receiver, a system manager interface, and front panel interface.

The control microprocessor 1300 used on the controller module is an Intel 80188. This is a 16 bit processor that includes 2 channels of DMA, 4 interrupts, 3 timers, 13 decoded address ranges and an 8 bit external interface.

The memory subsystem consists of 256K of dynamic RAM 1380 for message and variable storage, 2K of nonvolatile RAM 1370 for parameters, and sockets for 128K of EPROM 1360 for program storage.

Two 256K DRAMs are used for the DRAM array. These are for storing, for example, the group statistics, valid received messages, calibration results and such for the set-top terminals of the system. Consequently, these memories must be appropriately sized for storing the packet data. When the message data is transmitted to the system manager, the tables for storing terminal message data are cleared. Every time a read cycle to the EPROM occurs a "CAS before RAS" refresh cycle is given to the DRAM array. Normal code fetches to the EPROM should be sufficient to keep the DRAM refreshed. If there are more than 15 us between EPROM accesses, the DMA controller will read the EPROM. LCS on the 80188 is used to access the DRAM array. After reset, LCS must be programmed for an active memory range. After the initial setup of the DMA controller, refresh will occur without software intervention.

Two EPROM sockets are provided for up to 128K of program memory. These sockets can use any EPROM between 2764 and 27512. One socket is accessed by UCS and the other by MCS3. After a reset condition UCS will be active in the memory range from hex FFBF0 to FFFFF. MC53 must be programmed for an active range.

One 2K EEPROM 1370 is provided for nonvolatile storage of configuration information. Two identical copies of the configuration information are stored in the EEPROM. A checksum is stored with each copy to provide a means to verify the correctness of the copies. Should one of the copies be damaged, as with a loss of power during a write operation, the other correct copy will be used to restore the damaged copy. A programmer must be careful not to access the EPROM for 10 ms after a byte has been written to the chip. There is not a recovery delay after a read cycle. The chip is accessed by MCSO. MCSO must be programmed for an active range.

Each RF receiver channel has a dedicated Intel 8097 1310-1340 as an interface element. The 8097 processor decodes and frames the Miller encoded data from the RF receiver (RFRX) module, monitors the signal strength level from each RFRX module as well as from the signal strength analyzer (SSA) module, and controls the frequency of the RF synthesizer (SYN) module.

Each 8097 has its own associated 1k byte Dual Port RAM 1311-1341. These dual port memories are used to pass data and commands between the 8097s and the 80188. The memory includes a mechanism for BI-DIRECTIONAL interrupts. The software can define any convenient protocol for using the memory and interrupts. EPROMS 1312-1342 are provided for program storage for the 8097's. Also, LED's 1313-1343 are provided for receiver status indicators as will be herein explained.

A conventional UART 8250 serial chip is used to implement a serial interface 1350 to the System Manager. One of the 80188 interrupts is connected to the 8250 so the serial channel may be interrupt driven. The 8250 can operate at frequencies up to 38.4K baud.

Modem handshaking signals are available (RTS,DTR,etc.). The multiplexer on the system manager may utilize or ignore these signals as desired. The receiver will be configured as a DTE, similar to the known phone processor board.

The front panel consists of a keypad 860 and an LCD display 850 and an LED bank 1390. Keypad 860 is most conveniently a sixteen key keypad comprising decimals 0-9 and function keys such as help, next page, next line, enter, clear, and menu. The keyboard/display provides for switchless configuration, meaningful error indications, and local access of built-in test and diagnostic routines. The LED bank 1390 provides various status indications as will be herein explained.

The LCD display for four lines of twenty characters is accessed via two registered ports. The viewing angle may be changed by keyboard actuation as will be described further herein. Display data is loaded into one port and the strobe commands are loaded into the second port. The strobes to the display are relatively slow (1 ms).

When a key is pressed, an interrupt is generated to the 188. The encoded key data can be identified by reading a four bit register. When this register is accessed the interrupt is cleared. The keypad logic includes a debounce circuit which prevents another interrupt from being generated until the end of the debounce delay.

The controller module also serves the role of power distribution for the RF-IPPV processor. The controller module switches power to elements as required. Each cable that connects this board to an RF receiver or a synthesizer includes 4 +12 V lines, 3 −12 V lines, 3 +5 V lines and 6 ground lines as required.

There are 12 LEDs on the front of the RF-IPPV processor for status monitoring. Eight LEDS, two for each receiver, 1313-1343, indicate the status of the 4 receivers. There is also a bank 1390 of four LED's provided. Two LEDs monitor activity on the serial port. One LED indicates the status of the buffer and the final LED displays power condition. These four are shown as LED bank 1390 connected to the bus system via a latch.

When data is received on a channel, the top LED on that channel will blink green. The bottom LED on each channel will be green if the channel is enabled and red if the channel is disabled. Entering an invalid frequency into the System Manager or the Front Panel will cause a channel to be disabled. Normally all channels should be enabled.

In the unlikely condition that one of the receivers fails a self test, the top LED for that channel will be continuous red and the bottom LED will flash red.

Two LEDs marked TXD and RXD indicate activity on the serial port connecting the RF-IPPV processor to the System Manager. If data is transmitted from the RF processor to the System Manager, the TXD light will blink. Conversely, if data is received by the RF processor from the System Manager, the RXD light will blink.

An LED marked Buffer indicates the status of the buffer between the RF processor and the System Manager. If the LED is off, there is no data in the buffer to the System Manager. If the LED is green, the buffer is less than half full. As the buffer passes half full, the LED will change from continuous green to flashing green. If the buffer becomes completely full, the LED will change to flashing red. Under normal circumstances, the buffer should never become completely full.

The LED marked Power will be green when the power is on. After turning power on this LED will be briefly red and then change to green. If the RF processor ever encounters an unrecoverable situation, this LED will change briefly to red while the RF processor restarts itself.

The system manager RF-IPPV calibration controller program along with the RF-IPPV processor are responsible for calibrating RF-IPPV module transmitters associated with set-top terminals. The calibration process insures that data being transmitted from the set-top to the RF processor arrives at an appropriate level. Furthermore, by automatically and periodically calibrating all terminals in a system, any requirement for automatic gain control at the RF-IPPV processor is eliminated. The calibration controller controls the flow of commands to the RF-IPPV module during the calibration sequence and based on responses received from the module, determines its calibration status. The calibration controller program and process is described completely in copending U.S. application Ser. No. 07/562,675 filed on Aug. 3, 1990, and entitled "Cable Television Radio Frequency Return Method," which is incorporated herein by reference.

Viewing Statistics Generation and Collection

The present invention permits each set-top terminal to generate and the system manager to collect viewing statistics at predetermined times. The viewing statistics generated and collected could comprise a variety of data which could be measured by the set-top terminal, such as viewer profile data or television status data. Viewer profile data includes such information as who in a household is watching a particular television program, the age of that person, the sex of that person, etc. Television status data includes such information as the television channel being viewed at any particular time, the sound volume level of a channel being viewed, the luminance of the television channel, etc. In one embodiment of the present invention, the television channel being viewed by one or more subscribers is the particular viewing statistic being generated and collected. The process of generating and collecting this type of viewing statistic will be discussed in detail below. The apparatus and methods of generating and collecting other types of viewing statistics will naturally closely resemble those of this embodiment.

Referring to the diagram in FIG. 13, the various storage locations located within each STT are shown. Each STT possesses a plurality of collection slots which consist of a record time storage location RTSL, a channel storage location CSL (the viewing statistics storage location), and a time code storage location TCSL. For example, in a present implementation, the system manager generates a global transaction which defines four record times at which an RF-IPPV module should record the channel to which its set-top terminal is tuned. The record times are stored in record time storage locations $RTSL_1$ through $RTSL_4$ at each set top terminal, which are preferably composed of nonvolatile memory locations (NVM 503 in FIG. 4), but may also be random access memory locations. These record times may be within any convenient time period such as a day, a week, a bi-week, and the like.

For illustrative purposes, it will be assumed that the system manager instructs the RF-IPPV module to record the tuned set-top terminal channel on Sunday at 7:00 PM, Tuesday at 9:00 PM, Thursday at 8:00 PM, and Thursday at 10:00 PM in a one week time period. As explained above, these four record times are stored in four record time storage locations ($RTSL_1$ through $RTSL_4$), located in non-volatile memory NVM 503 in a preferred embodiment. A real time clock derived from a 4 MHz crystal clock (501 in FIG. 4) maintains the current real time for each RF-IPPV module. In order to maintain precision and uniformity, this clock may be updated periodically by the system manager through a downstream transaction.

Microprocessor 504 periodically performs a comparison between the various record times stored in NVM 503 and the value of the real time clock, and when a match occurs, the RF-IPPV module records in a channel storage location CSL corresponding to the record time the channel then being tuned by the set-top. Referring to FIG. 4, the channel storage location is located within memory 503, and is stored under control of microprocessor 504. Microprocessor obtains the current channel being viewed through data bus 490 from the set-top terminal microprocessor 400 (FIG. 3). Microprocessor 400 obtains the current channel being viewed from NVM 470.

As discussed below, this viewing statistics data is included in an Event/Viewing Statistics Reply transmitted upstream to the system manager. For example, this reply includes information related to the number of bytes in the message, the type of message, the STT digital address, the recording times and channels which were tuned by the STTs at those recording times, and any IPPV purchase data. However, the contents of this reply is not limited to this data, but may also comprise in another embodiment data representing other viewing statistics relating to the particular viewers watching television programs or data corresponding to the status of the television set itself.

In a preferred embodiment, a record time sent to the set-top terminals is composed of a multi-bit quantity that uniquely designates one or more specific future times at which to record the desired viewing statistics. The number of unique times which can be delineated in this case may be represented by the following formula:

$$\# \text{ of Unique Times} = 2^b$$

where b equals the number of bits utilized. For example, if the record time was comprised of a 16-bit quantity that uniquely specified a one minute interval, $2^{16}$, or 65,536 different one minute intervals could be represented. Given 60 minutes in an hour and 24 hours in a day, this resolution could theoretically correspond to any one minute interval in a 45 day period (65,536/60/24=45.5 ... ). A greater or lesser amount of bits could be used just as easily, giving a greater or lesser resolution (e.g., down to a second) and/or a greater or lesser time period.

After the record time is transmitted to each set-top terminal, it is stored in a record time storage location RTSL associated with the particular collection slot being addressed. Thereafter, when a record time stored in a particular collection slot matches the current real time clock located within the set-top terminal the channel then being viewed is stored in the channel storage location CSL for that collection slot, and a time code corresponding to the current time is stored in the corresponding time code storage location. Because of the possibility that the set-top terminal and accompanying television set might not be in use at this time, provision could be made to record the status of the on/off switch of the set-top terminal as well. Referring to the set-top terminal block diagram of FIG. 3, the power supply includes an auxiliary AC outlet into which the television set may be plugged. Thereafter, when the viewer turns the set-top terminal off via an external keypad, this AC outlet switches off, and the television set turns off. Whether this AC outlet is on or off is controlled by the microprocessor 400, and this status information could be stored along with, or in place of, the channel being viewed in the channel storage location.

As described previously, various types of viewing statistics may be stored when the record time is equal to the value of the real time clock. For convenience, the types of data which may be monitored and recorded at the remote STT may be broken down into two categories: Viewer profile data and Television status data. Viewer profile data may include data such as the identity of the viewer watching a television program, the age of this viewer and the sex of this viewer. Referring again to FIG. 3, a keyboard 440 is shown for entering commands and data by the user of the set-top terminal. This keyboard may also be used by the viewer of a television program to enter his/her identity before or during the television program. This data may then be stored along with the other viewing statistics data in NVM 503 or other memory and may be included in the upstream reply to the system manager, and compared with subscriber profile data in order to determine the specific audience type for different television programs.

In addition to data entered on a keyboard by the viewer of a television program, the unique remote terminal identification code assigned to the various remote terminals may be included as viewing statistic data in the upstream reply for purposes of comparison with subscriber profile data stored by the system manager. Subscriber profile data relating to a specific remote terminal, as opposed to an individual viewer, could be used to determine the viewing patterns of a household, rather than an individual viewer. For this information to be gathered, it would not be necessary for an individual viewer to enter his/her identity on a set-top terminal keyboard, as the specific remote terminal identification code would already be stored within the particular remote terminal.

Television status data may include data such as the television channel being viewed, the on/off status of a television set, the sound volume level of a television set, the luminance of the television set, etc. This information may be directly accessed by the RF-IPPV module and set-top terminal and stored along with other viewing statistics data in NVM 503 or other memory, and may subsequently be transmitted upstream to the system manager along with any viewer profile data, as discussed below.

After the record time has passed, and the channel and time code have been stored, the system manager may issue a polling command, either globally or addressed, for the set-top terminal(s) to transmit the contents of one of their channel and time code storage locations upstream to the system manager. At this time, each set-top terminal transmits a reply containing the viewing statistics data (channel viewing data in a preferred embodiment) and time code data to the system manager for processing. The contents and format of this reply will be discussed in more detail below.

The above-mentioned time code is stored in the set-top terminal and forwarded to the system manager in order to assure that the system manager is able to distinguish which channel viewing information is being returned. Each of the various collection slots will be programmed and collected from repeatedly for differing record times, and therefore it is necessary to be able to match viewing information returned from each set-top terminal to the corresponding point in time in which it was generated. For example, if a set-top terminal is not able to return its channel viewing information for a collection slot before that particular slot is re-programmed with another record time, the time code returned will serve as an indication that the channel viewing information returned was generated for a previous programming/collection cycle. This can be accomplished because the system manager is able to keep track of the record times associated with each slot and compare this information with the returned time code.

Like the record time, the time code is a multi-bit quantity that uniquely identifies a specific point in time within a specified period. In a preferred embodiment, the time code is composed of 8 bits having a resolution of one hour intervals. In this case, using the formula outlined above, $2^8$, or 256 different one hour intervals can be represented. Given 24 hours in a day, this corresponds to roughly 10 days (256/24=10.6 ... ). Likewise, in another embodiment, the time code may have a greater or lesser resolution within a greater or lesser time period.

Referring to FIG. 14, a timing diagram is shown depicting the record times sent to the remote terminals, and the resulting time codes returned to the system manager in the preferred embodiment described above. In the preferred embodiment, the resolution of the record times $RT_1$ through $RT_4$ are in minutes while the resolution of the time codes $TC_n$, etc., are in hours. Also in the preferred embodiment, four slots A through D are implemented to record channel viewing information not more than four times per hour.

In this embodiment, the one hour resolution of the time code is sufficient to uniquely identify the hour in which a particular slot was programmed. It is assumed that no two subsequent record times for any particular slot would ever fall within the same hour, and therefore a one hour resolution for the time code is sufficient to adequately identify the viewing information being returned. In other words, the resolution of the time code is not tied to the resolution of the record time, but only to the number of collection slots utilized and how often the slots are used (in this case, once per hour). Because the system manager keeps track of the time at which a specific slot was programmed, there can be no ambiguity relating to which record time the collected viewing information relates because each collection slot is never utilized more than once in any hour. Also, because the number of bits in the time code is kept to a minimum, the amount of time necessary to transmit the time code upstream to the System Manager is also minimized, thus reducing the probability of collisions between transmissions from different STTs.

For example, referring to FIG. 14, suppose record times $RT_1$, $RT_2$, $RT_3$, and $RT_4$ correspond to 7:10, 7:25, 7:35, and 7:50 respectively, times which all fall within the same one hour period (7:00 to 8:00). When the record time equals the real time clock at each STT, the channel currently being viewed is stored in a channel storage location and the current time, in hour increments, is stored in a time code storage location. In this example, the contents of the time code storage location would correspond to the 7:00 to 8:00 hour period. When each STT subsequently returns the contents of these locations to the system manager, the system manager would then determine that the returned information relates to the record times falling within the 7:00 to 8:00 period as opposed to previous record times programmed in earlier programming/collecting cycles.

The time period which can be represented by the eight bit time code does not completely cover the period which can be represented by the 16 bit record time described above, but the 10 day period is considered to be sufficient to adequately allow all RF-IPPV modules to return their viewing statistics information to the system manager. The number of bits and resolution of the record time and time code described above should not be construed to be a limitation of the present invention, but merely an example of a configuration which demonstrates a preferable and practical mode of operation.

Figure 15:
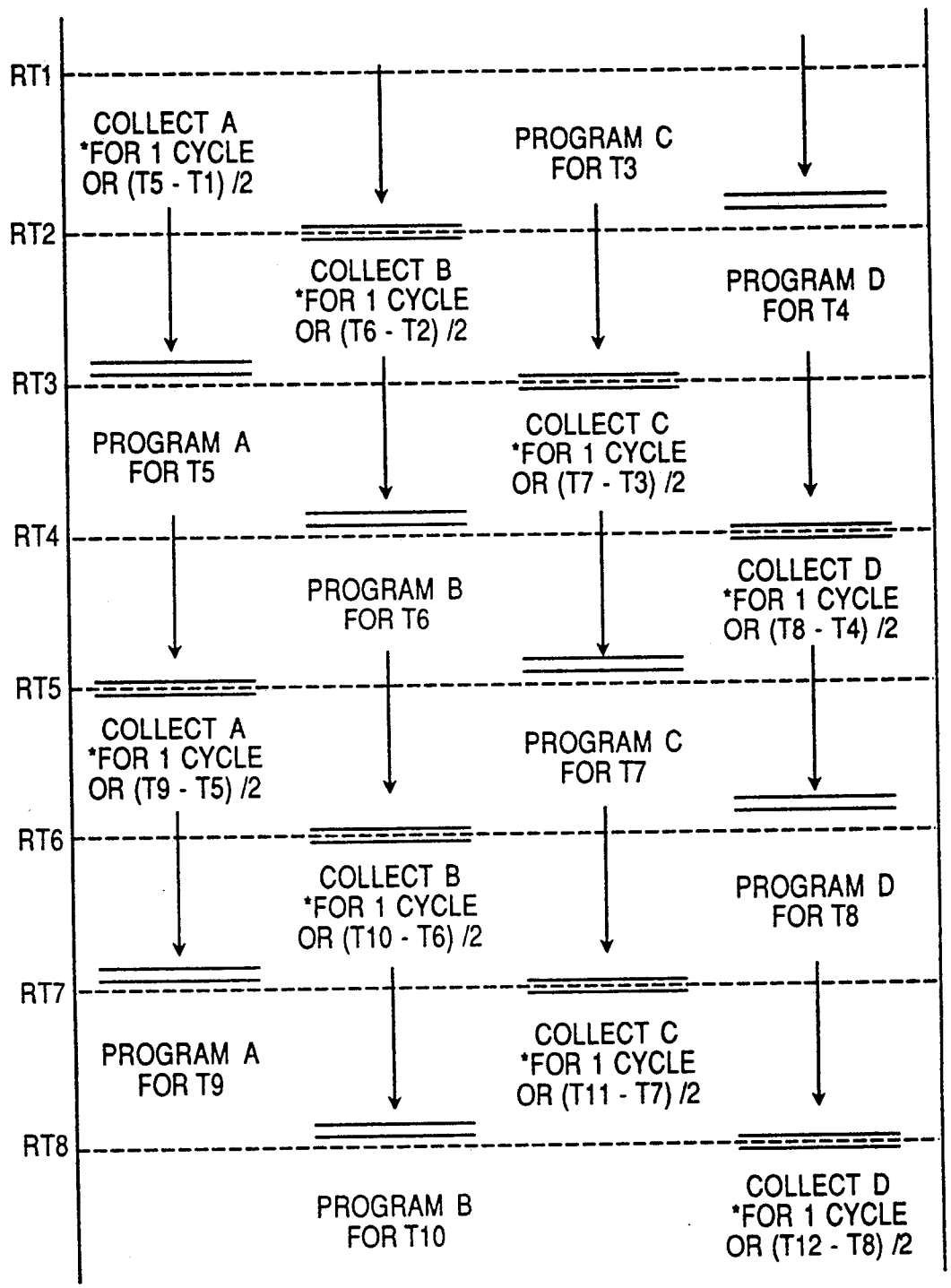
FIG. 15 is a timing diagram showing program and collection sequences for each of four set-top terminal storage location pairs.

FIG. 15 reveals a sample timing diagram for programming each RF-IPPV module with a record time and subsequently collecting the channel viewing information in the preferred embodiment. As can be seen from this diagram, each slot can be utilized individually from one another. In other words, while the system manager is transmitting a record time down to the RF-IPPV module for one slot, it can be collecting previously stored channel and time code information from another slot. To fully understand this method of "rolling" from one slot to another, a detailed discussion of FIG. 15 follows.

Initially, starting at time $RT_1$, it can be assumed that collection slot A had been previously programmed by the system manager with a record time of $RT_1$. Additionally, at $RT_1$, collection slots B and C are in the process of being programmed by the system manager with record times of $RT_2$ and $RT_3$, respectively, and collection slot D is currently being collected from by the system manager.

At $RT_1$, the system manager issues either a global or addressed polling signal instructing one or more STTs to begin transmitting the contents of their channel storage location CSL and time code storage location TCSL corresponding to collection slot A upstream. Each STT then proceeds to attempt to transfer this collection slot A viewing information to the system manager for a specified period. In a preferred embodiment, the programming and collection period are roughly equally divided in the one hour cycle during which each collection slot is used. If each slot is programmed and collected from less regularly than once per hour, then the collection period may be correspondingly longer. However, a maximum amount of time for collection may be arbitrarily placed at one cycle time (one hour), as this amount of time should be sufficient in order to obtain a reasonable reply rate from most set top terminals. Therefore, as indicated in the diagram as $(RT_5 - RT_1)/2$, the collection time allotted for each slot need only be the smaller of one cycle time or (roughly) half of the time between one record time and the next.

Proceeding forward in time, the collection period for collection slot D expires immediately before $RT_2$. At this point, an adequate reply is presumably obtained from each STT for this slot, and thereafter slot D's programming period begins. The system manager then begins to reprogram this slot by transferring a record time of $RT_4$ to each STT, which is stored in each STT's record time storage location RCSL (see FIG. 13) for this slot.

At $RT_2$, the programming period for collection slot B expires, and the system manager sends a global or addressed polling signal to one or more STTs in order for the viewing statistics collection period for this slot to begin. Thereafter, each STT addressed by the polling signal commences to send its viewing information (the contents of its channel and time code storage locations) for slot B upstream to the system manager. The period of time reserved for the upcoming collection period is the same as described above for collection slot A. During this time, as evident from FIG. 15, collection slots A, C and D are in their respective programming or collection states operating independently from one another.

Immediately before $RT_3$, the collection period for collection slot A expires, and the system manager proceeds to re-program this slot with a new record time ($RT_5$). By this point in time, the plurality of STT's responding to the collection polling signal have had an ample opportunity to return their viewing statistics to the system manager. As with the collection polling signal described above, the system manager may program the STTs globally or in an addressed manner. When a collection slot is re-programmed with a new record time, and existing information stored in that slot's channel and time code storage locations is cleared in order to prevent the re-transmission of the same data to the system manager.

At $RT_3$, the programming period for collection slot C expires, and the system manager sends a polling signal downstream to one or more STTs to begin the collection period for that slot. The amount of time allotted for the subsequent collection period is the same as that described above for collection slots A and B.

Immediately before $RT_4$, the collection period for slot B expires, and the system manager re-programs this slot with a record time of $RT_6$. At $RT_4$, the programming period for collection slot D expires and the system manager sends a polling signal, as described above for the other slots, to one or more STTs. Each STT then begins to transmit its viewing information for slot D upstream to the system manager for a specified period as described before.

Immediately before $RT_5$, the collection period for collection slot C expires, and this slot is re-programmed with a record time of $RT_7$. Finally, at $RT_5$, the programming period for collection slot A ends, and the system manager sends a polling signal directing one or more STTs to begin the collection period. Thereafter, each STT begins send the contents of its channel and time code storage locations upstream to the system manager. At this point, a complete cycling through every collection slot has been completed, and the process begins anew.

This method of "rolling" from one slot to the next has several significant advantages over programming all slots and thereafter collecting from all slots. If all slots are programmed before the corresponding viewing information is collected, the amount of time available for collection is reduced for those slots having record times nearer the end of the programming/collection cycle. For example, if four slots are utilized and the record times for each slot are 7:10, 7:14, 7:40 and 7:50, respectively, the latter slots have only a minimum amount of time to be collected before the next programming cycle begins. If the next programming cycle was to begin at 8:00, the RF-IPPV modules would only have 10 minutes in which to transmit the channel information upstream to the system manager before that particular slot was re-programmed.

A related limitation of the method where all slots are programmed followed by collection involves a situation where too little time exists to reprogram certain slots after the previous collection period. For example, in the above example, if the initial programming period began at 7:00 and proceeded on an hourly basis thereafter, there might not be enough time to program all four slots before the first record time transpired. Hence, the total amount of time necessary to program all four slots might take 30 minutes, which might extend beyond the first two record times. There is a possibility that either or both of these record times would have already passed before that particular slot was programmed, and the critical time to record the channel then being viewed would have been missed.

As described before, FIG. 15 graphically represents the "rolling" method of programming and collecting which obviates the two limitations discussed above. By staggering the time periods during which each slot is alternately programmed and collected from, the time for each operation can be equally proportioned for all four slots. Instead of being confined to alternately programming and then collecting from all slots en masse, each operation can be performed on only one collection slot at a time while another slot is in the midst of another operation.

For example, referring once again to FIG. 15, at $RT_4$ the system manager sends a polling command to one or more STTs in order for the collection period to begin for slot D. Meanwhile, collection slot A is in the latter half of its programming period, slot B is in the beginning of its programming period, and slot C is in the midst of its collection period. Therefore, the system manager needs to perform a polling operation on slot D only, and is not burdened with operating on the three other slots as well, which could create the timing problems outlined previously. At no time is the system manager performing an operation on more than one slot at a time resulting in an even distribution of time requirements throughout the programming and collecting periods for all slots.

In one alternative embodiment, the system manager could download an addressed viewing statistics transaction to only a subscriber who has agreed to permit monitoring of his viewing habits. In yet another embodiment, the system manager could download an addressed viewing statistics transaction to only a particular group of set-top terminals.

Viewing Statistics Record Time Programming

The record time programming instruction transmitted from the system manager to one or more addressed set-top terminals, in the preferred embodiment, is illustrated in FIG. 18. In a preferred embodiment, the record time instruction is composed of 96 bits, divided up into 24 4-bit nibbles within three 32 bit words. The first four nibbles (from the left) contain the values 1, 5, 0, and 0 respectively, and the 9th, 10th, and 12th nibbles contain the values 6, 5, and 0 respectively. The values of these nibbles uniquely identify this instruction as a record time programming instruction. The rest of the nibbles contain values corresponding to the collection slots being programmed and the respective record times associated with these collection slots.

Referring to the accompanying legend of FIG. 18, there are two types of data included in the programming instruction: Record times, indicated by $T \times 0$ through $T \times 3$ (where x is a collection slot designation A through D), and an accept time mask, ACT. The record time for each collection slot is composed of 4 nibbles, or 16 bits. The accept time mask is composed of one nibble, or 4 bits. The diagram in the figure indicates that the record time for slot A, TA0–TA3, occupies the 5th, 6th, 7th and 8th nibbles from the left; the record time for slot B, TB0–TB3, occupies the 13th, 14th, 15th and 16th nibbles; the record time for slot C, TC0–TC3, occupies the 17th, 18th, 19th and 20th nibbles; and the record time for slot D, TD0–TD3, occupies the 21st, 22nd, 23rd, and 24th nibbles.

The legend of FIG. 18 also indicates that the record time bits are sent with the most significant bits first. That is, for example, TA0 contains bits 12–15, TA1 contains bits 8–11, and so on. For the accept time mask, the least significant bit ($ACT_0$) corresponds to collection slot A, while the most significant bit ($ACT_3$) corresponds to collection slot D.

In one embodiment of the present invention, more than one collection slot is programmed with a record time in the same transaction. In another embodiment, namely the "rolling" method of programming described previously, only one collection slot is programmed in any given transaction. The structure of the present record time programming instruction allows either of these situations to be accomplished while utilizing the same instruction format. This is accomplished through the use of the accept time mask, ACT.

As explained previously, the accept time mask, ACT, is composed of one nibble, or 4 bits, of data. Each bit corresponds to one of the four collection slots utilized in the preferred embodiment. If the value of a particular bit is 1, then this is interpreted by the set-top terminal to indicate that the associated record time is a valid record time and that the STT should record the channel being viewed at the appropriate time. On the other hand, if the value of the particular bit is 0, this indicates to the STT that the associated record time is merely a dummy time, and should not be taken to mean that the channel should be recorded at a future time for that particular slot.

For example, suppose that the system manager wishes to instruct every set-top terminal to record the channel being viewed at times 8:00 and 8:15. In this case, the system manager could transmit the record times of 8:00 and 8:15 in locations TA0-TA3 and TB0-TB3 respectively. The contents of TC0-TC3 and TD0-TD3 would not be used but would still be included to keep the length of the programming instruction constant. The value of the accept time mask, ACT, would be set accordingly so that the set-top terminal would know which slots were being programmed. In this case, the system manager would set bits $ACT_0$ and $ACT_1$ to the 1 value, and set $ACT_2$ and $ACT_3$ to the 0 value. In this way, the set-top terminals would know which of the collection slot were being programmed.

It is important to realize that each of the record time locations TA0-TA3 through TD0-TD3 can be used independently from one another. In the above example, slots B and D could have been programmed just as easily as slots A and B. In this case, the appropriate record time locations corresponding to slots B and D, TB0-TB3 and TD0-TD3, would be loaded with the record times, and the mask bits for slots B and D, $ACT_1$ and $ACT_3$, would be set to 1 to indicate that these two record time were valid. Accordingly, the mask bits for slots A and C, $ACT_0$ and $ACT_2$ would be set to 0 to indicate that these two slots did not contain valid record times. The values placed in record time locations TA0-TA3 and TC0-TC3 could be set to any arbitrary value as these locations would simply be used as place holder in the instruction. In this way, any number of record times could be programmed into any combination of collection slots with each instruction.

Data Return Sequence

FIG. 5 shows a time line representation of a typical data return sequence. As mentioned above, the total RF-STT population is divided up into manageable subgroups of approximately equal size. These are simply referred to as groups. The length of time that each group is allowed to return data in is called the group period (or simply the period). During RF-IPPV data retrieval, the system manager sequentially sends a data request to each group in a cable system headend. One complete data return sequence of all groups is referred to as a cycle. Finally, a sequence of two or more cycles that make up a complete (typically daily) data return sequence is called a zone. If an RF STT returns its data during a given zone and receives an acknowledgment, that RF STT will not retry during that zone. Each group data return request sent out by the system manager includes the group number and the current cycle and zone numbers.

There are two types of auto-replies: global and addressed. Global auto-reply may be further broken down into cyclic and continuous auto-reply. In a cyclic auto-reply, the user defines a time interval during which the RF-IPPV modules will respond. In a continuous auto-reply, the system defines the time interval, such as 24 hours. With reference to FIG. 5, in either a cyclic or a continuous auto-reply, the time interval is called a zone. Each zone is assigned a unique number so an RF-IPPV module may ascertain whether it has already responded during a particular zone. Each zone is subdivided into a plurality of cycles. A cycle is defined as the amount of time required for entire population of RF-IPPV modules to attempt to reply. Each cycle is assigned a unique number (within a zone) so an RF-IPPV module may ascertain whether it has already responded during its cycle. Due to RF collisions, all RF-IPPV modules may not get through to the RF receiver. In order to increase the probability that a particular RF-IPPV module will get through to the RF receiver, a minimum number of cycles per zone may be defined. The minimum number of cycles per zone is configurable.

Each cycle is subdivided into groups. A group is a subset of the total population of RF-IPPV modules in the system. Each RF-IPPV module is assigned to a particular group and has an associated group number. The group number may be assigned to the RF-IPPV module via an external source (user defined) or can be derived from the digital address through the use of a shift value as described in greater detail below. Regardless of how its associated group number is derived, an RF-, IPPV module will only respond to a global auto reply during its group time. Each RF-IPPV module is further assigned a configurable retry number. The retry number represents the number of times a given RF-IPPV module will attempt to respond during its group time.

The reply algorithm of the present invention will first be described in general and subsequently will be described in particular detail.

The reply algorithm of the present invention is based on trying to maintain a constant number of attempted replies. This constant is called the reply (attempt) rate and is measured in number of RF-IPPV modules per second. The reply rate is configurable. In order to maintain a constant reply rate, the number of RF-IPPV modules in a group must be limited. This constant will be referred to as the maximum number of modules in a group. The maximum number of modules in a group is configurable. Based on the maximum number of modules in a group, the number of groups in a cycle can be calculated as follows:

# of Groups = RF Module Population/Maximum in a group

In a system in which group numbers are derived automatically from the digital address as discussed below, the number of groups is rounded up to the next power of 2.

The average number of RF modules in a group can be calculated as follows:

Avg. # in Group = RF Module Population/# of Groups

This number is used to calculate the group length in seconds as follows:

Group Length = Avg. # in Group/Reply Rate

The length of a cycle (in seconds) can then be calculated as follows:

Cycle Length = Group Length * (Number of Groups)

The number of cycles in a zone can be calculated as follows:

# of Cycles = (Zone end time − Zone Start Time)/Cycle Length

If the calculated number of cycles is less than the minimum number of cycles allowed, the number of cycles is set to the minimum. The minimum zone length can then be calculated as follows:

Minimum Zone Length = # of Cycles * Cycle Length

This number is compared against the zone length assigned by the user in the case of a cyclic auto-reply to determine whether the given zone length is long enough.

At the start of an auto-reply sequence, the above values are calculated. The system assigns a new zone number and a starting cycle number. The auto reply control sequence is then ready to begin. The system starts with the first group in this cycle of this zone and proceeds until the calculated number of groups in a cycle is reached. The cycle number is then incremented and a check is made to determine whether the total number of cycles for this zone has been exceeded (i.e. the end of the zone has been reached). If not, the group number will be reset and the sequence will continue.

While a group of RF-IPPV modules is replying, the system is receiving data and placing the data into its data base. After the data from an RF-IPPV module has been successfully placed in the data base, an acknowledgment is sent to the RF-IPPV module. Part of the data being forwarded from the RF-IPPV module to the system is a checksum of all the event data. This checksum is an acknowledgment code and is sent back to the RF-IPPV module in the acknowledgment message. If the acknowledgment code matches that originally sent with the event data, the data will be deleted from the RF-IPPV module memory. If the RF-IPPVodule does not receive an acknowledgment message from the system during the current cycle, the RF-IPPV module will respond again during the next cycle of the present zone. If the RF-IPPV module receives an acknowledgment message during the current zone, the RF-IPPV module will not respond until the next zone. All RF-IPPV modules which have replied, regardless of whether any event data was sent with the data, will be sent an acknowledgment code. This will cause the number of collisions to decrease with each successive cycle in the zone.

The addressed auto-reply or poll is designed to retrieve IPPV data from a specific RF-IPPV module. The information sent to the RF-IPPV module is the same as in the global auto-reply with the following exceptions. The digital address of the RF-IPPV module being polled is included, the zone number is set to zero, and the rest of the information (Group, Cycle, Shift value, etc.) is set up so the RF-IPPV module will reply as quickly as possible even if there are no purchases to report.

In a current implementation, the group size is maintained between 2500 and 5000 set-top terminals. Set-tops are added to existing groups until each group has 5000 set-tops. When each group has 5000 set-tops, the number of groups is doubled in order that each group again has 2500 set-tops. For illustrative purposes, it will be assumed that a set-top population P initially consists of 3500 set-top terminals in a single group. As set-top terminals are added to the population P, the total population is compared with the upper limit of 5000. When the population consists of 5000 set-top terminals, the number of groups is doubled from one to two. Thus, the two groups each contain 2500 set-top terminals. As new set-top terminals are added to the population, the number of terminals in each of the two groups increases. When each of the two groups contains 5000 terminals, the number of groups is again doubled to yield a total of four groups, each of the four groups containing 2500 set-top terminals.

It has been empirically determined that the optimal attempt rate for the current RF-IPPV return system is 50,000 attempts per hour. In order to maintain this attempt rate constant, the group time must vary as set-top terminals are added to the system. In the present implementation, to maintain the attempt rate constant, the group time length, or the time length during which each set-top in the group must attempt to transmit its data, must increase from 3 minutes to 6 minutes.

The above principles may be represented by a simple algorithm. This algorithm may be utilized when the groups are automatically set utilizing bits of the digital address of the set-top terminals. Assume initially, the number of groups G is equal to 1 and the total set-top terminal population is equal to N, then $$\text{while } (G < 2) \text{ or } (P/G > 5000) \quad\quad 1)$$
$$G = 2 * G$$
$$S = P/G \quad\quad 2)$$
$$T = K * S \quad\quad 3)$$

where S is equal to the number of converters per group, T is equal to the group time, and K is a constant chosen to maintain a constant attempt rate which, in the above example, is equal to 3 minutes per 2500 converters.

The group of which a particular converter is a member is determined by utilizing a particular number of bits of the converter address. For example if the number of groups is equal to eight, the last three bits of the converter address are utilized. If the number of groups is equal to sixteen, the last four bits of the set-top address are utilized.

At the beginning of a group time, the system manager downloads a transaction to the RF-IPPV processor to indicate that a new group time is being initiated. The system manager then sends out a global command to the set-tops indicating that a new group time is being started and which group number is being polled. The set-top terminal includes a psuedo-random number generator. The psuedo-random number generator may comprise, for example, a free running timer or counter associated with each set-top. The psuedo-random number generator generates a plurality of start times corresponding to the number of attempts and the number of return frequencies. For example, if the set-top is instructed to make three attempts and the return path utilizes four frequencies, the psuedo-random number generator generates twelve random numbers. These random numbers are scaled to the group period.

Messages from the STT to the headend do not overlap. However, in a current implementation, rather than generating random numbers within a given group period which do not overlap, the module will wait until a given transmission is complete prior to initiating a second transmission even if, strictly speaking, the second transmission should have been initiated prior to termination of the first message. It will be apparent to those of ordinary skill that a set of non-overlapping random numbers may be generated and utilized to determine the transmission times and the invention should not be limited in this respect.

Groups

One method of having RF-STTs return data is to have the entire population transmit this data at some time during a predetermined callback period. However, this technique could potentially result in a reverse amplifier overload and generate undesirable effects in the forward path if the entire population attempted to transmit at the same time. Thus, it is preferable to divide the population into a plurality of groups. Nonetheless, a group equal to the entire RF-STT population may be utilized.

RF-STTs are assigned to groups by one of two methods. In cases where it is important that individual RF-STTs belong to a particular group (for example, if use of bridger switching is required), each RF-STT may be assigned to a specific group using an addressed group assignment transaction. A cable operator may desire to assign given set-top terminals to particular groups based on buy rates or other factors associated with a particular group or subset of the entire population. Other reasons may exist for cable operators to assign given members of a population to a given group and the present invention should not be limited in this respect. In this event, the number of groups is arbitrary within the range of 2 to 255. Also, group sizes may not be equal, and the group periods may need to be adjusted individually to allow for the different size groups. As it is an object of the present invention to eliminate bridger switching, it is more desirable if grouping assignments not be predetermined by the bridger switching network.

In the more common case, individual group assignment is not required. All RF-STTs are directed by a global transaction to use the least significant bits of the STT unique digital identifier (address) as the group number. The number of groups in this case is always a power of two (2, 4, 8, 16, etc.). Because the low order RF-STT address bit patterns are very evenly distributed in a large population of units, the number of STTs in each group is virtually identical and equal to the total number of RF-STTs divided by the number of groups. Two factors determine the actual number of groups.

The first factor is the optimal rate R at which STTs attempt to send messages to the RF-IPPV processor irrespective of the number of retries. The second factor is a convenient minimum group callback period $P_{min}$. Then, the total RF-IPPV STT population may be divided into a maximum number of $2^n$ manageable sized groups by picking the largest value of n for which $$\frac{\# \text{ of } STTs}{2^n} >= R \times P_{min}$$

The power of 2, n, determined by this equation is then the number of low order bits that each RF-STT must use to determine the group of which it is a member. For example, if n is determined to be four, then there are 16 total groups and each RF-STT would use the least significant four bits of its address as a group number.

Attempt Rate

The optimal RF-STT attempt rate R used in the above equation is simply expressed as an average number of RF-STTs per unit time. However, each RF-STT has a configurable retry count, so the actual message attempt rate is equal to the number of RF-STTs in a group, times the number of transmissions (retries) that each unit makes, divided by the length of the group period. During a data return period, the average rate and length of message transmissions occurring determines the message density and therefore the probability of a collision occurring for any given transmission. Assuming that the average length of transmissions is relatively fixed, then the rate at which RF-STTs attempt to transmit return data is a primary influence affecting probability of collision, and conversely message throughput.

Low message attempt rates result in a lower probability of collision, while higher message attempt rates result in a correspondingly higher probability of collision for any given message. However, high success rates at low attempt rates (or low success rates at high attempt rates) can still result in a low overall throughput. Therefore, the measure of actual success rate is the probability of success for any message times the RF-STT attempt rate. For example, if 1000 RF-STTs attempt to return data in a one minute period, and the probability that any message will be involved in a collision is 20%, then the actual success rate is:

1000 RF-STTs×(100−20)%/MIN=800 RF-STTs/MIN

A numerically high RF-STT success rate is not the final measure of throughput in an RF-IPPV system unless it results in a near 100% success rate. Since the data returned represents revenue to the cable operator, all RF-STTs must return the data stored therein. Approaching a near 100% success rate may take two or more periods in a statistical data return approach. To continue the example, assume that a group has the above success rate during the first data return cycle. 800 RF-STTs per minute might be an extremely desirable throughput rate, but it is not acceptable to leave 20% of the group in a non-reporting state. During the next data return cycle, the 800 successful RF-STTs should have received data acknowledgments. As discussed above, RF-STTs that receive an acknowledgment corresponding to the exact data stored in secure memory do not respond again until a new zone begins. Therefore only the 200 RF-STTs that were unsuccessful in the first cycle should attempt to return data. This results in a much lower probability of collision during the second cycle. For illustrative purposes, it will be assumed the probability that any message will be involved in a collision is 1%. During this one minute period, 200×(100−1)%=198 RF-STTs are successful. Combining the two cycles, there is an effective success rate of:

800+198 RF-STTs/2 MIN or 499 RF-STTS/MIN

This rate is achieved with nearly 100% of the RF-STTs reporting and is therefore a very good measure of the real system throughput. The "optimal" attempt rate is thus defined as that attempt rate which yields substantially 100% effective success rate for a given number of RF-STTs in the least amount of time.

The present invention has used a simulation technique based on a model of the RF-IPPV data return system to determine optimal attempt rates. However, it should be noted that while choosing an optimal attempt rate affects the performance of the system, it is not critical to the operation of the present invention.

The description and calculations detailed above assume that data return is achieved for returning IPPV event data from IPPV modules. However, the RF return system of the present invention may be applied broadly to systems in which a plurality of remote units or terminals attempt to transfer stored data to a central location. Requirements for burglar alarm, energy management, home shopping and other services are generally additive to IPPV service requirements. Some efficiencies in scale, however, may be achieved by combining data return for certain of these additional services into transactions for IPPV service although different addressable or global commands and responses may be appropriate for different transactions, especially real time requirements such as the delivery of two-way voice (telephone) communications.

RF-IPPV Module Transmitter Level Adjustment

For a number of reasons, including S/N ratio and adjacent channel interference requirements, it is necessary that the RF- IPPV transmitter data carrier output levels be set to near optimum for the reverse channel. Furthermore, for low installation cost, ease of maintenance, repeatability and reliability, it is very desirable that the adjustment of the output level be as automatic as possible. Accordingly, a thorough description of a procedure and apparatus for automatic transmitter calibration is described in copending U.S. application Ser. No. 07/562,675 filed on Aug. 3, 1990, and entitled "Cable Television Radio Frequency Return Method," which is incorporated herein by reference.

RF-IPPV Processor/System Manager Communication and STT/RF-IPPV Module Operation A complete description of a procedure and apparatus for communication between the RF-IPPV processor and the system manager and between an STT and an RF-IPPV module is described in copending U.S. application Ser. No. 07/562,675 filed on Aug. 3, 1990, and entitled "Cable Television Radio Frequency Return Method," which is incorporated herein by reference.

Miller Data Encoding

The RF-IPPV Module transmits data using Miller data encoding. Miller encoding, also known as delay modulation, transmits a "1" with a signal transition in the middle of the bit interval. A "0" has no transition unless it is followed by another "0" in which case the transition occurs at the end of the bit interval. The use of Miller encoding in the present invention is described in detail in copending U.S. application Ser. No. 07/562,675 filed on Aug. 3, 1990, and entitled "Cable Television Radio Frequency Return Method," which is included herein by reference.

RF-IPPV Module and RF-IPPV Processor Data Transmission Sequence

For each data transmission, the RF-IPPV module performs the following sequence:

A. Begin toggling transmitted data line at 10 kHz rate. This is to charge up the data filter.
B. Set gain to minimum.
C. Turn on the switched +5 V to the RF circuitry.
D. Delay approximately 1 ms for switched 5 V to settle.
E. Set correct PLL frequency (read from NVM).
F. Delay approximately 20 ms for the PLL to lock.
G. Key-down the anti-babble circuit.
H. Delay approximately 1 ms for the final output stage to settle.
I. Ramp up to correct gain (read from NVM).
J. Transmit the data.

When data transmission is complete, the RF-IPPV module performs the following sequence:

A. Generate Miller error in transmitted data to end transmission (for receiver).
B. Ramp gain down to minimum.
C. Key-up anti-babble circuit.
D. Delay approximately 1 ms to avoid chirping.
E. Turn off switched +5 V.

These sequences are detailed in FIG. 15 using the following definitions:

| | |
|---|---|
| Switched 5 V on to PLL Data In | $t_{on}$ |
| PLL Lock Delay | $t_{LK}$ |
| Data Filter Charge Time | $t_{CHG}$ |
| Anti-Babble Key-Down to PGC Ramp Up | $t_{AB}$ |
| PGC Ramp Up | $t_{RU}$ |
| PGC Ramp Down | $t_{RD}$ |
| PGC Ramp Down to Switched 5 V Off | $t_{OFF}$ |

The data transmission sequence mentioned at step "J." above can be further broken down into its constituent elements. FIG. 16 shows a graphical representation of a sample Event/Viewing Statistics Reply Packet, in a preferred embodiment. The complete packet in this diagram comprises a typical packet transmitted from the RF-IPPV Processor to the system manager. The contents of this packet includes the Event/Viewing Statistics Reply received from a set-top terminal with additional leading and trailing information appended thereto. The components of the sample packet are now described:

Referring to FIG. 16, the left-most column, labelled "Byte", contains the respective byte number(s) for each particular location within the packet. The second column, labelled "Description", contains the description of each particular location. The third column, labelled "Value", contains the range of proper values, in either hexadecimal (denoted by "h") or decimal (no denotation) format, for each particular location. Finally, the last column, labelled "Comments", contains additional descriptive comments regarding the proper values for each particular location. In addition, the various components of the reply packet are indented in order to graphically illustrate at which point each particular component was added.

The first left-indented grouping of components, labelled "RF-IPPV Processor Originated" and corresponding to bytes 0 through 17, comprises header information generated by the RF-IPPV Processor relating to the type of data included in the packet. This header information is tacked onto the accompanying set-top terminal replies by the RF-IPPV Processor. Beginning with the first component, for bytes 1 and 2, the description reads "Reply Type". As can be seen from the "Value" column, the value of this location is equal to 0 for an Event/Viewing Statistics Reply Packet. For other types of replies, such as calibration and frequency selection responses, this value would be correspondingly different.

The next component consists of bytes 2 and 3 and corresponds to the "Receiver Status". The value of this location corresponds to the status of the RF-IPPV Processor receiver. In the preferred embodiment, only 4 bits of this 2-byte component are utilized. Bit 0 indicates a Power Up status; bit 1 indicates a Setup Request; bit 2 indicates a local lockout; and bit 3 indicates an error status.

Bytes 4 through 7 consist of a "Message Remaining Count" corresponding to the number of "messages" to be sent from the RF-IPPV Processor to the system manager. In the present invention, the term "message" refers to an Event/Viewing Statistics Reply, but as explained before, could also refer to other types of messages which the RF-IPPV Processor sends to the system manager. The number of messages which can be sent to the system manager at one time is limited, and therefore the value of this component refers to the total number of messages waiting to be sent, including the messages (replies) of the current packet. In the preferred embodiment, the value of this component may be in the range of 0 through 65,535.

Bytes 8 through 11 consist of a "Unique Message Count", which refers to the number of unique, or non-duplicated, message received by the RF-IPPV processor from the plurality of set-top terminals. As explained before, given the somewhat noisy upstream environment of the physical cable plant, each set-top terminal transmits its Event/Viewing Statistics Reply numerous times over varying frequencies. This necessarily leads to some redundancy in the replies received by the RF-IPPV Processor, which discards duplicated messages. Therefore, the number of unique messages received thus far is reported to the system manager in these bytes. In the preferred embodiment, the value of this component may be in the range from 0 through 65,535.

Proceeding downward to the next component in this group, bytes 12 and 13 consist of a "Packet Count" corresponding to the number of messages (replies) in the Event/Viewing Statistics Packet. In the preferred embodiment, the value of this component may be in the range from 0 through 255.

Finally, bytes 14 through 17 correspond to the "Packet Length". This value denotes the total number of bytes in the packet, and in the preferred embodiment, may be in the range from 0 through 65,535.

The next group of components of the Event/Viewing Statistics Reply Packet, labelled "RF-STT Originated", comprise that part of the packet relating to information gathered from one or more of the set-top terminals. Most of this information is taken verbatim from the viewing statistics information transmitted from the particular set-top terminal to the RF-IPPV Processor, which is graphically illustrated in FIG. 17. The contents of this reply mirror the contents of the reply transmitted upstream by the set-top terminal, and therefore the elements of this reply are discussed below in relation to both FIGS. 16 and 17.

The Event/Viewing Statistics Reply transmitted from a set-top terminal to the RF-IPPV Processor contains 4 bytes of initializing information. As can be seen in FIG. 17, bytes 1 through 3 contain a "preamble" denoting that the subsequent bytes to be transmitted are an Event/Viewing Statistics Reply. The preamble consists of a sequence of three bytes equal to AA (hex). After these three bytes are transmitted, a "Start of Message" (SOM) byte is transmitted equal to AB (hex). Thereafter, the remaining bytes of the reply are transmitted as described below.

Bytes 1 and 2 of the reply, in FIG. 16, correspond to a "Level Rating" value which indicates the power level of the reply received by the RF-IPPV Processor from the set-top terminal. Because this measurement is made by the RF-IPPV Processor, this is the only component of this portion of the packet not initially transmitted by the set-top terminal, but instead added by the RF-IPPV Processor during transmission to the system manager. This value is subsequently used by the system manager to initiate a recalibration of the output power level of the set-top terminal, if necessary. In the preferred embodiment, the value of this component may be in the range from 0 to 2, where 0 indicates that the level is too high, 1 indicates the level is OK, and 2 indicates that the level is too low. Recalibration would occur if the level is too high or too low.

Bytes 2 and 3, labelled "Reply Length", in FIG. 16 represent the length in bytes of the subsequent message, not including the preceding Level Rating value. In the original reply transmitted upstream by the set-top terminal, shown in FIG. 17, this element is located at byte 5. In the preferred embodiment, the value of this component may be in the range from 0 through 255.

The next component of the reply consists of bytes 4 and 5, labelled "Message Type" in FIG. 16. In the original reply transmitted from the set-top terminal, as shown in FIG. 17, this element is located at byte 6. The value of this component indicates whether the set-top terminal is operating in-band or out-of-band, as described previously. This value is sent to the RF-IPPV Processor from the set-top terminal. If the value of this component is equal to 4, then this indicates out-of-band operation; if equal to 14 (hex), this indicates in-band operation.

Bytes 6 through 13 correspond to the "STT Address" in FIG. 16. In the original reply transmitted from the set-top terminal, as shown in FIG. 17, this element is located at bytes 7 through 10. Each set-top terminal is assigned a unique address which is returned to the RF-IPPV Processor with the Event/Viewing Statistics Reply, and this identifier is passed along to the system manager.

The next section of the Event/Viewing Statistics Reply, represented by bytes 14 through 29 in FIG. 16, contains the actual viewing statistics which were transmitted from the set-top terminal upstream to the RF-IPPV Processor. In the original reply from the set-top terminal, as shown in FIG. 17, this element is located at bytes 11–18. In the preferred embodiment, as shown in FIG. 16 and 21, four viewing slots are utilized (A to D), and each has the capability of reporting back the channel viewed and the time viewed. In the figure, the channel viewed is represented by "View Channel n" and the time at which the channel was viewed is represented by "Time Code n", where n is a slot letter A to D. For the "View Channel n" component, valid values must be in the range 0-128 and 255, where 0 indicates no channel being viewed, 1-128 indicate the channel being viewed, and 255 indicates that this slot has already been reported. The value of "Time Code n" must be in the range 0-255, where this value corresponds to a time having a lower resolution than the record time originally programmed for that slot.

In the preferred embodiment utilizing the "rolling" method of programming and collecting from the different collection slots, as described before, only one slot is transmitted upstream to the RF-IPPV Processor at a time, so therefore all of the values of the various "View Channel n" locations would be equal to 255, except for the slot in question, which would either be 0 (for no channel being viewed) or between 1-128 for a particular channel number.

The remaining 4 bytes in this section, namely bytes 30-33, labelled "Security Nibble" and "Auth Channel Checksum" in FIG. 16, and "AUTH" and "EVENT" in FIG. 17, correspond to special security and authorization information transmitted by the RF-IPPV Processor to the system manager in order to assure integrity of the system, and to assure that only those channels authorized to be viewed at any particular set-top terminal are actually being viewed.

The next section of the Event/Viewing Statistics Packet contains information relating to event information sent upstream by a set-top terminal to the RF-IPPV processor. The present invention is concerned primarily with the transmission of viewing statistics upstream, but because the present overall system can also be used to monitor events occurring at each set-top terminal, this portion of the packet is included for completeness. As can be seen from FIG. 16 and 21, more than one event may be monitored and reported within a single packet, with each event occupying 10 bytes. In FIG. 16, event 1 constitutes bytes 0 through 9, and additional events reported within the packet occupy additional 10 byte blocks. In the original reply transmitted from the set-top terminal to the RF-IPPV Processor, each event constitutes 5 bytes, with the first event represented by bytes 21-25.

The next section of the packet, labelled "Reply Checksum (LSB first)" in FIG. 16, and "CHECK" in FIG. 17, corresponds to a additive checksum generated by the set-top terminal and used as an error detection means. Two bytes are utilized as a checksum on the previous reply information returned in the packet, and are sent along with the packet. The checksum is generated by adding each transmitted character to the lowest-significant-byte (LSB) of the checksum. The result is then rotated left by one bit. The checksum is initially set to 0. Each character up to, but not including the checksum is included in the checksum.

The following section of the packet, labelled "Packet Checksum", corresponds to an additive checksum generated by the RF-IPPV Processor and used as an error detection means. This checksum is generated precisely as described above, except that each character of the overall packet transmitted is added, not just the set-top terminal reply information.

Finally, a carriage return (CR) character is transmitted from the RF-IPPV Processor to the system manager to signify the end of the packet. At this point, the system manager checks all checksums to verify that no errors occurred during transmittal. If errors are detected, a re-transmit command is sent to the RF-IPPV Processor, and the entire transmission sequence is repeated.

What has been described are the preferred embodiments of the present invention. Other embodiments will be apparent to one of ordinary skill in the art. The present invention is not limited to the embodiments described herein but is only limited by the claims appended hereto.

I claim:

1. In a bi-directional cable television system comprising a system manager for controlling a plurality of remote terminals over a cable television signal distribution system, a method of generating and collecting viewing statistics including at least data representing the channel being viewed at one or more remote terminals, the viewing statistics generating and collecting method comprising the steps of:

(a) transmitting from the system manager to one or more remote terminals data representing record times consisting of specific times at which each remote terminal is to store viewing statistics data, (b) storing said record times in one of a plurality of record time storage locations at each remote terminal, (c) comparing the contents of each of said record time storage locations to the real time generated from a clock located at each said remote terminal, (d) generating viewing statistics data, and (e) storing viewing statistics data at each said remote terminal in a channel storage location, if the contents of said record time storage location matches said real time.

2. The viewing statistics generating and collecting method of claim 1, wherein the viewing statistics generated in step (d) correspond to television status data maintained within each said remote terminal.

3. The viewing statistics generating and collecting method of claim 1, wherein the viewing statistics generated in step (d) correspond to viewer profile data input from a source external to each said remote terminal.

4. The viewing statistics generating and collecting method of claim 1, wherein the transmission in step (a) is addressed globally to all said remote terminals.

5. The viewing statistics generating and collecting method of claim 1, wherein the transmission in step (a) is addressed to a specific group of said remote terminals.

6. The viewing statistics generating and collecting method of claim 1, wherein the transmission in step (a) is addressed to a specific one of said remote terminals.

7. The viewing statistics generating and collecting method of claim 1, further comprising the steps of:

(f) storing a time code corresponding to said real time in a time code storage location at each remote terminals, if the contents of said record time storage location matches said real time clock.

8. The viewing statistics generating and collecting method of claim 7, further comprising the step of:

(g) transmitting from each said remote terminal to the system manager the contents of said channel storage location and said time code storage location, if the contents of said record time storage location matches said real time.

9. The viewing statistics generating and collecting method of claim 7, further comprising the steps of:

(g) transmitting from each said remote terminal to the system manager the contents of said channel storage location and said time code storage location in response to a polling signal from the system manager.

10. The viewing statistics generating and collecting method of claim 7, wherein one record time storage location corresponds to one channel storage location and one time code storage location.

11. The viewing statistics generating and collecting method of claim 10, wherein said time code storage location stores a time code having a resolution at least equal to the minimum time period during which information can be stored in all record time storage locations.

12. The viewing statistics generating and collecting method of claim 10, wherein four record time storage locations, four channel storage locations, and four time code storage locations are utilized.

13. The viewing statistics generating and collecting method of claim 12, wherein said record time storage location stores a record time consisting of at least 16 bits and having a resolution that uniquely specifies at most a one minute period.

14. The viewing statistics generating and collecting method of claim 12, wherein said time code storage location stores a time code consisting of at least 8 bits and having a resolution that uniquely specifies at most a one hour period.

15. The viewing statistics generating and collecting method of claim 9, further comprising the step of:
  (h) repeating steps (a)-(g) for a different record time storage location.

16. The viewing statistics generating and collecting method of claim 15, wherein step (h) is performed for a second record time storage location before the preceding steps (a)-(g) are completed for a first record time storage location.

17. A channel monitoring apparatus for monitoring remote terminal channel viewing information in a bi-directional cable television system, the channel monitoring apparatus comprising:
  (a) a system manager for initiating a programming function to program a remote terminal to record channel viewing information at a specific record time, and
  (b) transmission means for transmitting to one or more remote terminals record times relating to the specific time at which the remote terminal is to store viewing statistics data representing at least the channel being viewed.

18. The channel monitoring apparatus of claim 17, wherein the transmission means in step (b) transmits globally to all said remote terminals.

19. The channel monitoring apparatus of claim 17, wherein the transmission means in step (b) transmits to a specific group of said remote terminals.

20. The channel monitoring apparatus of claim 17, wherein the transmission means in step (b) transmits to a specific one of said remote terminals.

21. The channel monitoring apparatus of claim 17, wherein said system manager further comprising:
  (c) receiving means for receiving said stored channel viewing statistics data transmitted from one or more of said remote terminals.

22. The channel monitoring apparatus of claim 17, further comprising:
  (c) said transmission means including means for transmitting to one or more of said remote terminals a polling signal instructing those one or more remote terminals to transmit said channel viewing statistics data to the system manager, and
  (d) receiving means for receiving said channel viewing statistics data transmitted from one or more remote terminals.

23. The channel monitoring apparatus of claim 21, wherein said system manager further comprising:
  (d) processing means coupled to said receiving means for accumulating and collating said transmitted channel viewing statistics data.

24. A remote terminal channel recording and transmitting apparatus for use in a bi-directional cable television system, the remote terminal channel recording and transmitting apparatus comprising:
  (a) receiving means for receiving one or more record times relating to specific times at which the remote terminal is to store an identification of the channel which is then being viewed,
  (b) a plurality of record time storage location means for storing said one or more record times,
  (c) comparing means for comparing the contents of said record time storage location means to the time generating from a real time clock located at said remote terminal,
  (d) generating means for generating viewing statistics data corresponding to the channel being viewed, and
  (e) one or more channel storage location means for storing the viewing statistics data at said remote terminal, if the contents of said record time storage location means matches the time from said real time clock.

25. The remote terminal channel recording and transmitting apparatus of claim 24, wherein the viewing statistics generated in step (d) correspond to television status data maintained within each said remote terminal.

26. The remote terminal channel recording and transmitting apparatus of claim 24, wherein the viewing statistics generated in step (d) correspond to viewer profile data input from a source external to each said remote terminal.

27. The remote terminal channel recording and transmitting apparatus of claim 24, further comprising:
  (f) one or more time code storage location means for storing a time code corresponding to said real time, if the contents of said record time storage location matches said real time.

28. The remote terminal channel recording and transmitting apparatus of claim 27, further comprising:
  (g) transmitting means for transmitting from said remote terminal to the system manager the contents of said channel storage location means and said time code storage location means, if the contents of said record time storage location means matches said real time.

29. The remote terminal channel recording and transmitting apparatus of claim 27, further comprising:
  (g) transmitting means for transmitting from said remote terminal to the system manager the contents of said channel storage location means and said time code storage location means in response to an addressed polling signal from the system manager.

30. The remote terminal channel recording and transmitting apparatus of claim 29, wherein one record storage location means corresponds to one channel storage location means and on time codes storage location means.

31. The remote terminal channel recording and transmitting apparatus of claim 30, wherein said time code storage means stores a time code having a resolution at least equal to the minimum time period during which information can be stored in all record time storage locations.

32. The remote terminal channel recording and transmitting apparatus of claim 30, wherein four record time storage location means, four channel storage location means, and four time code storage location means are utilized.

33. The remote terminal channel recording and transmitting apparatus of claim 32, wherein said record time storage location means stores a record time consisting of at least 16 bits and having a resolution that uniquely specifies at most a one minute period.

34. The remote terminal channel recording and transmitting apparatus of claim 32, wherein said time code storage location means stores a time code consisting of at least 8 bits and having a resolution that uniquely specifies at most a one hour period.

* * * * *